US012586403B2

(12) United States Patent
Guill et al.

(10) Patent No.: US 12,586,403 B2
(45) Date of Patent: Mar. 24, 2026

(54) SYSTEMS AND METHODS FOR AUTOMATED DATA EXTRACTION OF UNSTRUCTURED DOCUMENTS

(71) Applicant: Vendr, Inc., Boston, MA (US)

(72) Inventors: Mark Ryan Guill, Boston, MA (US); Mark Anderson, Boston, MA (US); David Enochs, Boston, MA (US); Zachary Reynell Sheffer, Boston, MA (US)

(73) Assignee: Vendr, Inc., Boston, MA (US)

( * ) Notice: Subject to any disclaimer, the term of this patent is extended or adjusted under 35 U.S.C. 154(b) by 0 days.

(21) Appl. No.: 19/329,210

(22) Filed: Sep. 15, 2025

(65) Prior Publication Data

US 2026/0080705 A1      Mar. 19, 2026

Related U.S. Application Data

(60) Provisional application No. 63/695,202, filed on Sep. 16, 2024.

(51) Int. Cl.
*G06V 30/413*          (2022.01)
*G06V 30/19*          (2022.01)

(52) U.S. Cl.
CPC ...... *G06V 30/413* (2022.01); *G06V 30/19127* (2022.01)

(58) Field of Classification Search
CPC ........................ G06V 30/413; G06V 30/19127
See application file for complete search history.

(56) References Cited

U.S. PATENT DOCUMENTS

2019/0147103 A1*   5/2019   Bhowan ............... G06V 10/454
                                                               707/737
2021/0286989 A1*   9/2021   Zhong .................... G06N 20/20
(Continued)

OTHER PUBLICATIONS

D. Baviskar, S. Ahirrao, V. Potdar and K. Kotecha, "Efficient Automated Processing of the Unstructured Documents Using Artificial Intelligence: A Systematic Literature Review and Future Directions," in IEEE Access, vol. 9, pp. 72894-72936, 2021, doi: 10.1109/ACCESS.2021.3072900. (Year: 2021).*
(Continued)

*Primary Examiner* — Michael Robert Cammarata
(74) *Attorney, Agent, or Firm* — Foley & Lardner LLP

(57)          ABSTRACT
Systems and methods for automated data extraction of unstructured documents can include includes a processor coupled with memory, and configured to receive, from a client device, an electronic document corresponding to a client account and identify, from a plurality of classifications, a classification for at least a portion of the electronic document. Based on the classification, the processor can select a set of prompts for artificial intelligence models according to an extraction plan specifying the prompts and mapping rules to extract data elements from the document. The processor can transform the extracted data elements to map to predefined sets, establish relationships between normalized entities, and compare attributes of the electronic document with attributes of documents corresponding to different client accounts. The system can generate, based on comparisons, a parameter for an extracted data element and provide, for display on the client device, the parameter as a grade, score, or recommendation.

20 Claims, 18 Drawing Sheets

(56)                     References Cited

U.S. PATENT DOCUMENTS

| | | | |
|---|---|---|---|
| 2021/0319179 A1* | 10/2021 | Muffat | G06F 21/6245 |
| 2023/0092559 A1* | 3/2023 | Tekin | G06V 30/412 |
| | | | 705/7.35 |
| 2023/0214429 A1* | 7/2023 | Panico | G06F 16/355 |
| | | | 707/769 |
| 2024/0220511 A1* | 7/2024 | Shukla | G06F 16/285 |
| 2024/0265041 A1* | 8/2024 | Rennie | G06N 5/04 |
| 2024/0362944 A1* | 10/2024 | Bilgen | G06V 30/18 |
| 2025/0147957 A1* | 5/2025 | Verkruyse | G06F 16/24522 |
| 2025/0173331 A1* | 5/2025 | Volyn | G06F 16/24522 |
| 2025/0265248 A1* | 8/2025 | Xu | G06F 16/24549 |
| 2025/0315683 A1* | 10/2025 | Feehan | G06N 5/04 |
| 2025/0322245 A1* | 10/2025 | Rahman | G06N 20/20 |
| 2025/0329182 A1* | 10/2025 | Sureka | G06V 30/19093 |

OTHER PUBLICATIONS

Zhao, Xiaohui, et al. "Cutie: Learning to understand documents with convolutional universal text information extractor." arXiv preprint arXiv:1903.12363 (2019). (Year: 2019).*

* cited by examiner

300

570

800

Parameter 802

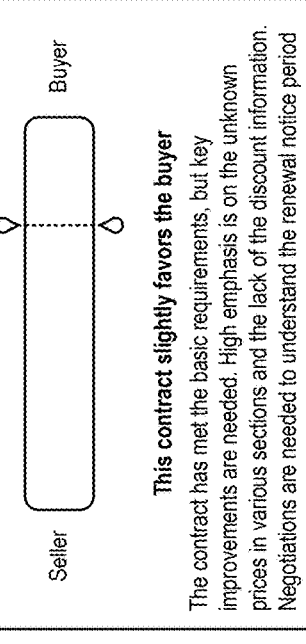

Overall contract strength

You still have some opportunity to save!

The contract has met the basic requirements, but key improvements are needed. High emphasis is on the unknown prices in various sections and the lack of the discount information. Negotiations are needed to understand the renewal notice period and to make sure the contract represents a fair deal.

Seller _____ Buyer

This contract slightly favors the buyer

The contract has met the basic requirements, but key improvements are needed. High emphasis is on the unknown prices in various sections and the lack of the discount information. Negotiations are needed to understand the renewal notice period and to make sure the contract represents a fair deal.

List price
$ 23.01 per seat / month
○ Acceptable range*
$ 19.01 - $24.62 per seat / month

*The acceptable range does not apply to renewal agreements where the buyer has already contracted at a high price and hasn't introduced significant leverage into the negotiation. This range signifies the pricing at which Vendor would find it acceptable to proceed with your purchase.

You're paying less than 53% of people with similar contracts
Based on Figma contracts for 1-250 seats

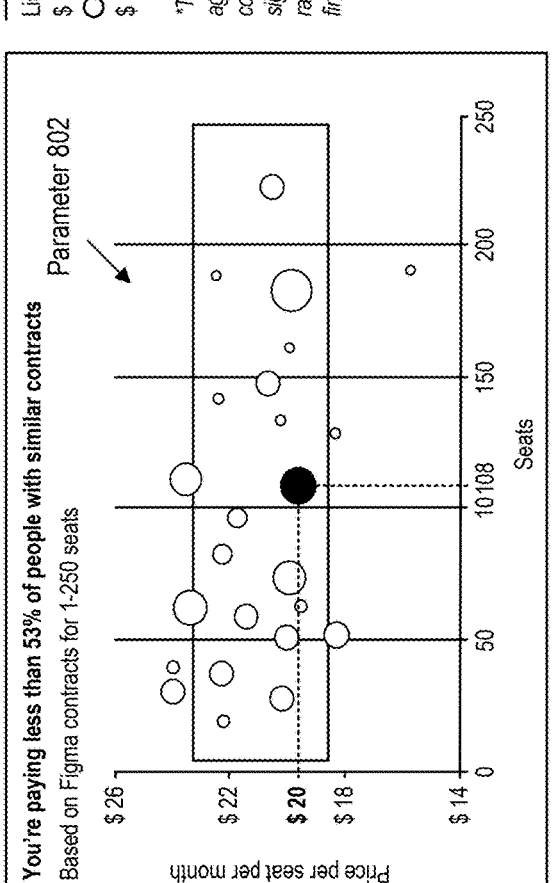

Parameter 802

Price per seat per month

Seats

SYSTEMS AND METHODS FOR AUTOMATED DATA EXTRACTION OF UNSTRUCTURED DOCUMENTS

CROSS-REFERENCES TO RELATED APPLICATIONS

This application claims the benefit of priority under 35 U.S.C. § 119 to U.S. Provisional Patent Application No. 63/695,202, titled "SYSTEMS AND METHODS FOR AUTOMATED DATA EXTRACTION OF UNSTRUC-TURED DOCUMENTS," filed Sep. 16, 2024, which is hereby incorporated by reference herein in its entirety and for all purposes.

TECHNICAL FIELD

This disclosure relates generally to computing technology and, in particular, to management of software as a service (SaaS) resource management using automated classification processes and data structures.

BACKGROUND

Data extraction from various documents that include unstructured information can be challenging for various reasons, including due to variability in format, mixed content types and context-dependent information. These complexities can make efficient data analysis more difficult, unreliable and computationally intensive.

SUMMARY

Extracting structured data from unstructured documents can include significant technical challenges due to the inherent variability in document formats, the presence of mixed content types, and the context-dependent nature of information embedded within such documents. Manual extraction processes can rely on substantial human effort, introduce inconsistencies, and be prone to error, particularly when processing documents such as contracts, agreements, invoices, or technical specifications. Rule-based extraction methods can lack the flexibility to adapt to diverse document layouts or to account for the semantic complexity of natural language, which can result in incomplete or inaccurate data extraction. Conventional systems can fail to provide scalable solutions for organizations that routinely manage large volumes of documents, since such systems can be limited by the inability to normalize and compare extracted data elements across different document types and client accounts.

The techniques described herein can use one or more processors coupled with memory to receive electronic documents from client devices, where the processors can be configured to classify one or more portions of a document into one or more classifications of a plurality of classifications. In some implementations, the processors can select, based on the classifications, one or more prompts for one or more artificial intelligence models to extract one or more data elements of the document according to an extraction plan. The processors can transform the extracted data elements for mapping to predefined sets according to one or more rules and can augment the transformed data elements according to one or more categories associated with the client account. In some implementations, the processors can store the data elements into a data structure associated with a plurality of data elements of a plurality of documents according to the classifications and categories, and can generate, using the data structure, one or more parameters of the data elements in reference to the plurality of data elements. The processors can identify temporal information of the document and can determine parameters based on temporal information and trends in prior processed documents. In some implementations, the system can support progressive output of extracted data elements as they become available, can support integration with external systems for ingestion, extraction plan selection, and result retrieval, and can support human review integration for documents with extraction errors, missing fields, or anomalies. The system can support security and compliance by using encryption and access controls for all data transfers and storage.

At least one aspect relates to a system. The system can include one or more processors coupled with memory. The system can receive, from a client device, an electronic document corresponding to a client account. The system can identify, from a plurality of classifications, a classification for at least a portion of the electronic document. The system can select, based on the classification, a set of one or more prompts for one or more artificial intelligence (AI) models according to an extraction plan specifying the set of one or more prompts and a set of one or more mapping rules to extract one or more data elements from the electronic document. The system can transform the one or more data elements extracted based on the set of one or more prompts to map to one or more predefined sets according to the set of one or more mapping rules of the extraction plan. The transformation can include processing the extracted one or more data elements using a schema that is configured to associate the extracted one or more data elements with corresponding one or more entities, and normalize the extracted one or more data elements according to a canonical format using the set of one or more mapping rules. The system can establish one or more relationships between the normalized one or more entities according to the canonical format. The system can compare, using the schema and the normalized one or more entities, attributes of the electronic document with attributes of one or more documents corresponding to one or more different client accounts, where the one or more documents corresponding to the one or more different client accounts are associated with the classification. The system can generate, based on the one or more relationships and the comparison of the attributes of the electronic document with the attributes of one or more documents corresponding to one or more different client accounts, a parameter for an extracted data element of the extracted one or more data elements from the electronic document by reference to one or more data elements corresponding to the one or more different client accounts. The system can provide, for display on the client device, the parameter for the extracted data element corresponding to one of a grade, a score, or a recommendation.

The system can determine a comparison metric based on a deviation between the normalized one or more entities and the attributes of one or more documents corresponding to one or more different client accounts that are normalized according to the canonical format. In some implementations, the system can compare, based on the comparison metric, the attributes of the electronic document with the attributes of one or more documents corresponding to one or more different client accounts.

The system can normalize data elements of the one or more documents corresponding to the one or more different client accounts according to the canonical format using the set of one or more mapping rules. In some implementations, the system can identify the attributes of one or more documents corresponding to one or more different client accounts based on the normalized data elements of the one or more documents. The system can determine the comparison metric as a deviation metric computed between attributes of normalized entities of the electronic document and a distribution of normalized attributes derived from the one or more documents corresponding to one or more different client accounts and to the classification.

The system can classify the electronic document as at least one of: a classification for a contract, a classification for an agreement, a classification for an invoice, a classification for a purchase order, a classification for a statement of work, a classification for a technical specification, a classification for a data sheet, a classification for a financial report, a classification for a service-level agreement, a classification for a proposal, or a classification for a memorandum of understanding. The system can receive the extraction plan from the client device, where the extraction plan comprises a plan identifier that specifies the set of one or more prompts and the set of one or more mapping rules.

The system can maintain relationships among entities in the schema, where the entities comprise at least one of: a SKU record, a product record, a product tier record, a product add-on record, and an acceptable range record. The system can provide, for display on the client device, the recommendation for at least one of: a target price, a discount range, or a contract term based on the comparison. The system can utilize artificial intelligence (AI) models comprising at least one of: a natural language processing model, a machine learning model, or a generative AI model.

The system can identify anomalies or outliers in the attributes of the electronic document relative to the attributes of one or more documents having the classification and associated with one or more different client accounts. The system can identify temporal information of the electronic document. In some implementations, the system can generate the parameter for the extracted data element based on the temporal information. The system can determine the parameter for the extracted data element based on temporal information of the one or more documents corresponding to the one or more different client accounts stored in the schema and based on a trend in the attributes of the one or more documents. The system can receive the electronic document using an application programming interface (API) call.

The transformation of the one or more data elements extracted from the electronic document comprises at least one of: removing non-textual characters from the extracted data elements that are string values, converting date values among the extracted data elements to a uniform date format specified by the extraction plan, mapping the extracted data elements to predefined categories or enumerated lists specified in the extraction plan, or applying rule-based logic specified by the extraction plan to fill missing values or correct inconsistencies in the extracted data elements. The system can provide, for display on the client device, each extracted data element as it is generated by the transformation of the one or more data elements extracted from the electronic document, prior to completion of the transformation of all data elements.

At least one other aspect relates to a method. The method can be performed, for example, by one or more processors coupled to non-transitory memory. The method can include receiving, from a client device, an electronic document corresponding to a client account. The method can include identifying, from a plurality of classifications, a classification for at least a portion of the electronic document. The method can include selecting, based on the classification, a set of one or more prompts for one or more artificial intelligence (AI) models according to an extraction plan specifying the set of one or more prompts and a set of one or more mapping rules to extract one or more data elements from the electronic document. The method can include transforming the one or more data elements extracted based on the set of one or more prompts to map to one or more predefined sets according to the set of one or more mapping rules of the extraction plan. The transformation can include processing the extracted one or more data elements using a schema that is configured to associate the extracted one or more data elements with corresponding one or more entities, and normalize the extracted one or more data elements according to a canonical format using the set of one or more mapping rules. The method can include establishing one or more relationships between the normalized one or more entities according to the canonical format. The method can include comparing, using the schema and the normalized one or more entities, attributes of the electronic document with attributes of one or more documents corresponding to one or more different client accounts, where the one or more documents corresponding to the one or more different client accounts are associated with the classification. The method can include generating, based on the one or more relationships and the comparison of the attributes of the electronic document with the attributes of one or more documents corresponding to one or more different client accounts, a parameter for an extracted data element of the extracted one or more data elements from the electronic document by reference to one or more data elements corresponding to the one or more different client accounts. The method can include providing, for display on the client device, the parameter for the extracted data element corresponding to one of a grade, a score, or a recommendation.

The method can include determining a comparison metric based on a deviation between the normalized one or more entities and the attributes of one or more documents corresponding to one or more different client accounts that are normalized according to the canonical format. In some implementations, the method can include comparing, based on the comparison metric, the attributes of the electronic document with the attributes of one or more documents corresponding to one or more different client accounts.

The method can include normalizing data elements of the one or more documents corresponding to the one or more different client accounts according to the canonical format using the set of one or more mapping rules. In some implementations, the method can include identifying the attributes of one or more documents corresponding to one or more different client accounts based on the normalized data elements of the one or more documents.

The method can include determining the comparison metric as a deviation metric computed between attributes of normalized entities of the electronic document and a distribution of normalized attributes derived from the one or more documents corresponding to one or more different client accounts and to the classification.

At least one other aspect relates to a non-transitory computer-readable medium. The non-transitory computer-readable medium can store instructions that, when executed by one or more processors, cause the one or more processors to receive, from a client device, an electronic document corresponding to a client account. The instructions can cause the one or more processors to identify, from a plurality of classifications, a classification for at least a portion of the electronic document. The instructions can cause the one or more processors to select, based on the classification, a set of one or more prompts for one or more artificial intelligence (AI) models according to an extraction plan specifying the set of one or more prompts and a set of one or more mapping rules to extract one or more data elements from the electronic document. The instructions can cause the one or more processors to transform the one or more data elements extracted based on the set of one or more prompts to map to one or more predefined sets according to the set of one or more mapping rules of the extraction plan. The transformation can include processing the extracted one or more data elements using a schema that is configured to associate the extracted one or more data elements with corresponding one or more entities, and normalize the extracted one or more data elements according to a canonical format using the set of one or more mapping rules. The instructions can cause the one or more processors to establish one or more relationships between the normalized one or more entities according to the canonical format. The instructions can cause the one or more processors to compare, using the schema and the normalized one or more entities, attributes of the electronic document with attributes of one or more documents corresponding to one or more different client accounts, where the one or more documents corresponding to the one or more different client accounts are associated with the classification. The instructions can cause the one or more processors to generate, based on the one or more relationships and the comparison of the attributes of the electronic document with the attributes of one or more documents corresponding to one or more different client accounts, a parameter for an extracted data element of the extracted one or more data elements from the electronic document by reference to one or more data elements corresponding to the one or more different client accounts. The instructions can cause the one or more processors to provide, for display on the client device, the parameter for the extracted data element corresponding to one of a grade, a score, or a recommendation.

An aspect of the technical solutions is directed to at least one of an apparatus, a device, a system or a method. The solution can include receiving, by one or more processors coupled with memory, an electronic document and an associated extraction plan selection. The solution can include initiating, by the one or more processors, a multi-phase extraction process on the electronic document. The multi-phase extraction process can include an extraction phase, wherein an optical character recognition (OCR) process is performed on the document and output of the OCR process is input into one or more artificial intelligence (AI) models guided by one or more prompts specific to a selected extraction plan. The multi-phase extraction process can include a transformation phase, wherein extracted data is processed to clean and standardize string values, perform canonicalization of data, map extracted values to predefined sets and apply rule-based transformations based on the overall extraction context. The multi-phase extraction process can include an augmentation phase, wherein transformed data is mapped to organization-specific identifiers, including at least one of: company identifiers, product identifiers, product tier identifiers or product addon identifiers. The solution can include generating, by the one or more processors, a job identifier for the extraction process. The solution can include outputting, by the one or more processors, extracted data elements as the extracted data elements become available during the extraction process. The solution can include transmitting, by the one or more processors, a payload containing all extracted and processed data elements upon completion of the multi-phase extraction process. The solution can be adaptable to various document types including, but not limited to, contracts and agreements, wherein the extraction plan selection determines the specific data elements to be extracted and the processing time of the extraction.

An aspect of the technical solutions is directed to a system. The system can include one or more processors, coupled with memory, to receive an electronic document corresponding to a client account. The one or more processors can be configured to classify one or more portions of the document into one or more classifications of a plurality of classifications. The one or more processors can be configured to select, based on the one or more classifications, one or more prompts for one or more artificial intelligence (AI) models to extract one or more data elements of the document according to an extraction plan. The one or more processors can be configured to transform the one or more data elements for mapping to predefined sets according to one or more rules. The one or more processors can be configured to augment the transformed one or more data elements according to one or more categories of a plurality of categories associated with the client account. The one or more processors can be configured to store the one or more data elements into a data structure associated with a plurality of data elements of a plurality of documents according to the plurality of classifications and the plurality of categories. The one or more processors can be configured to generate, using the data structure, one or more parameters of the one or more data elements in reference to the plurality of data elements.

The one or more processors can be configured to identify temporal information of the document and determine the one or more parameters based on the temporal information. The one or more processors can be configured to determine the one or more parameters based on temporal information of prior processed documents stored in the data structure and a trend in the data elements of the prior processed documents stored in the data structure.

The one or more processors can be configured to receive the document using an application programming interface (API) call. The extraction plan can include a selection of one or more fields to extract based on a document format. The one or more AI models can utilize optical character recognition (OCR) for identifying and extracting text from the document. The one or more AI models can be configured to process the extracted text using natural language processing (NLP) to identify contextual meaning.

The transformation of the one or more data elements can include at least one of: cleaning and standardizing string values, performing canonicalization of data or applying rule-based transformations based on the contextual meaning. The one or more processors can be configured to augment the transformed one or more data elements by mapping the transformed one or more data elements to at least one of: company identifiers, product identifiers, product tier identifiers, product add-on identifiers.

The one or more processors can be configured to classify the one or more portions of the document by identifying of the one or more portions of the document based on a document type. The document type can include at least one of: a contract, an agreement, an invoice, a purchase order, a statement of work, a technical specification, a data sheet, a financial report, a service-level agreement, a proposal or a memorandum of understanding. The one or more processors can be configured to query the stored data structure and compare parameters across a plurality of documents to facilitate analysis of contractual terms within the plurality of data elements.

The one or more processors can be configured to progressively output extracted data elements as the extracted data elements become available during a process of data extraction. The one or more AI models can include a generative AI model configured to provide to output responses to the one or more prompts.

An aspect of the technical solutions is directed to a method. The method can include receiving, by one or more processors coupled with memory, an electronic document corresponding to a client account. The method can include classifying, by the one or more processors, one or more portions of the document into one or more classifications of a plurality of classifications. The method can include selecting, by the one or more processors based on the one or more classifications, one or more prompts for one or more artificial intelligence (AI) models to extract one or more data elements of the document according to an extraction plan. The method can include transforming, by the one or more processors, the one or more data elements for mapping to predefined sets according to one or more rules.

The method can include augmenting, by the one or more processors, the transformed one or more data elements according to one or more categories of a plurality of categories associated with the client account. The method can include storing, by the one or more processors, the one or more data elements into a data structure associated with a plurality of data elements of a plurality of documents according to the plurality of classifications and the plurality of categories. The method can include generating, by the one or more processors, using the data structure, one or more parameters of the one or more data elements in reference to the plurality of data elements.

An aspect of the technical solutions is directed to a non-transitory computer readable medium storing program instructions for causing at least one processor to receive an electronic document corresponding to a client account. The instructions, when executed by the at least one processor, can cause the at least one processor to classify one or more portions of the document into one or more classifications of a plurality of classifications. The instructions, when executed by the at least one processor, can cause the at least one processor to select, based on the one or more classifications, one or more prompts for one or more artificial intelligence (AI) models to extract one or more data elements of the document according to an extraction plan. The instructions, when executed by the at least one processor, can cause the at least one processor to transform the one or more data elements for mapping to predefined sets according to one or more rules. The instructions, when executed by the at least one processor, can cause the at least one processor to augment the transformed one or more data elements according to one or more categories of a plurality of categories associated with the client account. The instructions, when executed by the at least one processor, can cause the at least one processor to store the one or more data elements into a data structure associated with a plurality of data elements of a plurality of documents according to the plurality of classifications and the plurality of categories. The instructions, when executed by the at least one processor, can cause the at least one processor to generate, using the data structure, one or more parameters of the one or more data elements in reference to the plurality of data elements.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

Aspects of the technical solutions are described in the detailed description which follows, in reference to the noted plurality of drawings by way of non-limiting examples of exemplary embodiments of the technical solutions.

FIG. 8 shows an example screen shot of a user interface providing results of the data processing system analysis to a client device.

DETAILED DESCRIPTION OF ASPECTS OF THE INVENTION

Figure 1:
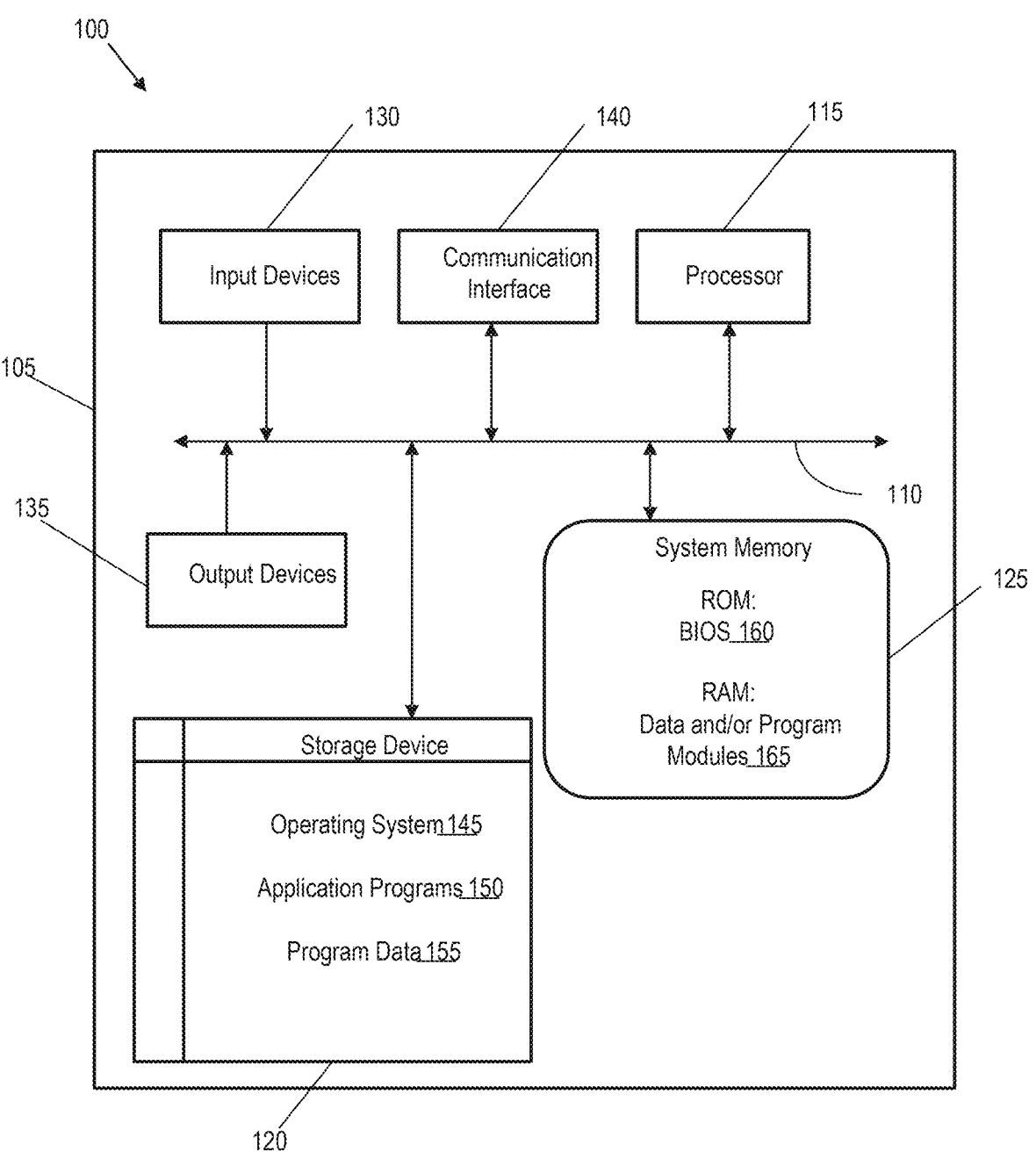
FIG. 1 is an illustrative architecture of a computing system implemented in embodiments of the technical solutions.

Aspects of the technical solutions of this disclosure are directed to AI-driven extraction of structured data from unstructured long-form documents using document classification techniques, natural language processing, and machine learning to enable automated analysis and decision-making processes. Data extraction from long-form documents containing unstructured information presents significant challenges. As organizations accumulate vast amounts of textual data in the form of reports, data sheets, technical documentation, articles, contracts, and other lengthy documents, there is an increasing need to efficiently extract relevant structured data to facilitate automated, efficient and reliable analyses and decision-making processes.

Traditional data extraction methods often struggle with long-form unstructured documents for several reasons. For instance, variability in format and structure can make document analyses more difficult than is the case when the document formats are standardized, due to variations in the layout, organization, and presentation of information. Likewise, context-dependent information can carry the meaning and relevance of data points that may depend on surrounding context that can be difficult for rule-based systems to interpret. Mixed content types can include documents frequently including a combination of text, tables, images, and other elements that can complicate data extraction. In addition, documents can include volumes of irrelevant information in the form of documents with large amounts of text that may not be pertinent to the specific data extraction goals. Similarly, ambiguity and natural language complexity can lead to unstructured text often including ambiguous phrasing, domain-specific terminology, and complex linguistic structures. These issues in combination can lead to series of challenges in terms of both the reliability and the compute power efficiencies of automated solutions for data extraction and analysis.

To address these challenges, the technical solution employs advanced document classification techniques to identify the type of document being processed. Based on this classification, the system selects tailored extraction routines or AI models to analyze the document and extract key attributes such as product names, pricing terms, contract length, and other relevant details. By leveraging a combination of natural language processing (NLP), machine learning (ML), and domain-specific heuristics, the solution adapts to variations in document structure and content, ensuring improved precision in data extraction. Furthermore, the extracted attributes are stored in a structured format, enabling the analysis of incoming documents by comparing their attributes with others in the field, aiding in more informed decision-making regarding the document's technical and contractual parameters.

The technical solutions can provide data extraction from long-form unstructured documents, such as documents focused on a Software as a Service (SaaS) agreements, using advanced document classification techniques to identify the specific type of document being processed. Based on the classifications, AI model implemented extraction routines can analyze the document to extract attributes, such as product names, pricing terms, contract length, and other relevant contractual details. By utilizing NLP, ML and domain-specific heuristics, data points can be identified and extracted from the documents, based on the context of the documents. The data classifications and attributes can be stored in one or more data structures, allowing for analyses and comparisons of various documents. These incoming documents can have their attributes and parameters (e.g., technical, pricing or other clauses in the agreements) determined and compared or ranked in reference to other, prior processed, parameters and attributes of other documents. This can allow the technical solutions to identify performance levels of the processed documents, in terms of their service or product terms (e.g., temporal duration of services or technical or financial parameters of the services provided) and determining the ranking and performance of such parameters with respect to other parameters in the field, to provide informed decisions with respect to these documents.

FIG. 1 is an illustrative architecture of a computing system 100 implemented in embodiments of the technical solutions. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100.

Figure 2:
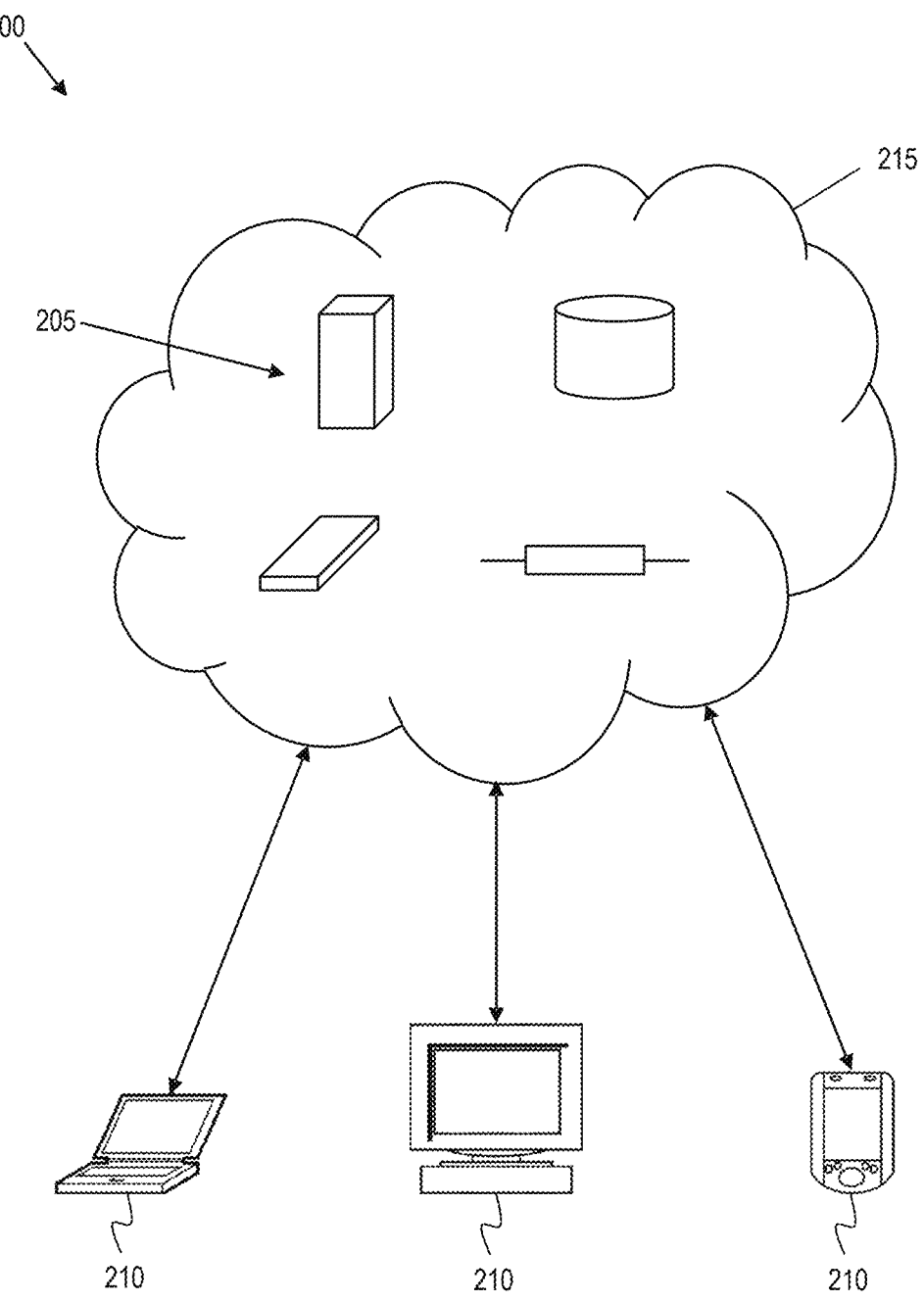
FIG. 2 shows an exemplary cloud computing environment in accordance with aspects of the technical solutions.

As shown in FIG. 1, computing system 100 includes a computing device 105. The computing device 105 can be resident on a network infrastructure such as within a cloud environment as shown in FIG. 2 or may be a separate independent computing device (e.g., a computing device of a third-party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data or power to, from, or between various other components of computing device 105.

The processor 115 may be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, or operations of the technical solutions, which may be operatively implemented by the computer readable program instructions.

For example, processor 115 provides an enterprise-wide security approach with all stakeholders (e.g., Dev teams, leadership, CSO office, etc.) with a set of various security scanner types and information sources integrated into a single tool. In embodiments, the processor 115 uniformly integrates or packages existing scanner types into a single tool that standardizes and visually displays the output over different development teams for different scanner types. The scanner types which are packaged into the integrated security tool can capture specific requirements of the different teams, i.e., ensures that the tools support varied team development methodologies and different tech stacks to capture required security vulnerabilities. The processor 115 also establishes a regular feedback mechanism and can be used to develop a process for remediation timelines and priority including at risk vulnerabilities.

In embodiments, processor 115 may receive input signals from one or more input devices 130 or drive output signals through one or more output devices 135. The input devices 130 may be, for example, a keyboard, touch sensitive user interface (UI). The output devices 135 can be, for example, any display device, speaker, printer, or any other device that can be used to present or provide output.

The storage device 120 may include removable/non-removable, volatile/non-volatile computer readable media, such as, but not limited to, non-transitory media such as magnetic or optical recording media and their corresponding drives. The drives and their associated computer readable media provide for storage of computer readable program instructions, data structures, program modules and other data for operation of computing device 105 in accordance with the different aspects of the technical solutions. In embodiments, storage device 120 may store operating system 145, application programs 150, and program data 155 in accordance with aspects of the technical solutions.

The system memory 125 may include one or more storage mediums, including for example, non-transitory media such as flash memory, permanent memory such as read-only memory ("ROM"), semi-permanent memory such as random-access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data or program modules 165, such as at least a portion of operating system 145, application programs 150, or program data 155, that are accessible to or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) or one or more wide area networks (WAN) using communication interface 140.

As discussed herein, computing system 100 may be configured to integrate different scanner types into a single workbench or tool. This allows developers and other team members a uniform approach to assessing security vulnerabilities in a code throughout the enterprise. Computing device 105 may perform tasks (e.g., process, steps, methods or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 or the one or more output devices 135 to facilitate performance of the tasks or realize the end results of such tasks in accordance with aspects of the technical solutions. In additional or alternative embodiments, hardwired circuitry may be used in place of or in combination with the program instructions to implement the tasks, e.g., steps, methods or functionality, consistent with the different aspects of the technical solutions. Thus, the steps, methods or functionality disclosed herein can be implemented in any combination of hardware circuitry and software.

FIG. 2 shows an example cloud computing environment 200 in accordance with aspects of the disclosure. In embodiments, one or more aspects, functions or processes described herein may be performed or provided via cloud computing environment 200. As depicted in FIG. 2, cloud computing environment 200 includes cloud resources 205 that are made available to client devices 210 via a network 215, such as the Internet. Cloud resources 205 may be on a single network or a distributed network. Cloud resources 205 may be distributed across multiple cloud computing systems or individual network enabled computing devices. Cloud resources 205 can include a variety of hardware or software computing resources, such as servers, databases, storage, networks, applications, and platforms that perform the functions provided herein including storing code, running scanner types and provided an integration of plural scanner types into a uniform and standardized application, e.g., display.

Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, or any other cloud deployment model. Cloud resources 205 may be configured, in some cases, to support multiple deployment models. For example, cloud resources 205 can provide one set of computing resources through a public deployment model and another set of computing resources through a private deployment model.

In embodiments, software or hardware that performs one or more of the aspects, functions or processes described herein may be accessed or utilized by a client (e.g., an enterprise or an end user) as one or more of a SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
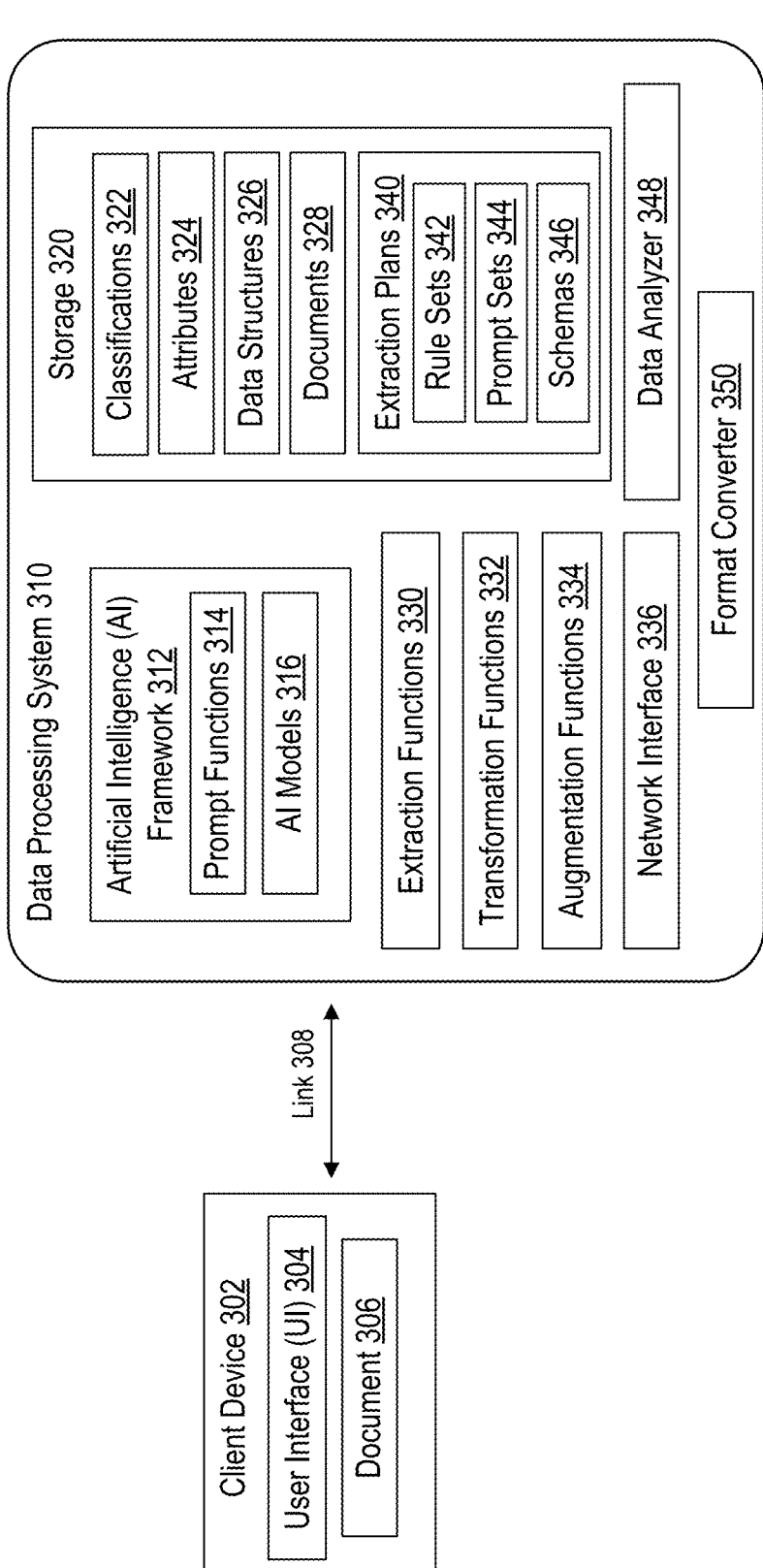
FIG. 3 shows an example block diagram of a system for providing an automated artificial intelligence (AI) driven data extraction and management of unstructured documents using a classification framework.

FIG. 3 shows an example block diagram of a system 300 for providing an automated artificial intelligence (AI) driven data extraction, analysis and comparison of unstructured documents using a classification framework. The system 300 can include a client device 302 transmitting or communicating a document 306 to the data processing system 310, via a link 308 (e.g., an internet or a network connection). The client device 302 can include a computing device (e.g., 105) such as a computer laptop or a smartphone including or operating one or more user interfaces (UIs) 302 and providing documents 306. The data processing system 310 can include, operate or utilize one or more of artificial intelligence (AI) frameworks 312, storages 320, extraction functions 330, transformation functions 332, augmentation functions 334, network interfaces 336, data analyzers 348 and format converters 350. The AI framework 312 can include or provide one or more of prompt functions 314 and one or more AI models 316 that can operate based on the prompt generated by the prompt functions 314. The storage 320 can include, store or provide one or more classifications 322, attributes 324, data structures 326 and prior processed documents 328, which can include various documents of other agreements and technical disclosure, such as the document 306. The storage 320 can store data on one or more extraction plans 340, rule sets 342, prompt sets 344 and schemas 346.

The client device 302 (e.g., a computer station) can utilize the UI 304 to provide, to a data processing system 310, a document 306, for example, via a link 308. The data processing system 310 can receive the document 306 for processing by an extraction function 330 to determine classifications 322. The extraction function 330 can extract various data elements from the document 306 to represent as data structures 326. The transformation function 332 can utilize prompt functions 314, prompt sets 344 and rule sets 342 selected according to extraction plans 340 to extract data elements from the document 306. The transformation functions 332 can process extracted data using schemas 346, attributes 324 and data structures 326 for association and normalization (e.g., conversion) of data according to a canonical data format. For instance, the transformation function 332 can transform the one or more data elements (e.g., represented via data structures 326) extracted from the document 306 based on the set of one or more prompt sets 344 to map to one or more predefined sets according to the set of one or more mapping rules 342 of the extraction plan 340. This transformation can involve processing the extracted one or more data elements (e.g., 326) using a schema 346 that is configured to associate the extracted one or more data elements of the document 306 with corresponding one or more entities of the schema and normalize the extracted one or more data elements according to a canonical format using the set of one or more mapping rules of the rule set 342.

The augmentation functions 334 can be configured to augment the transformed or processed data elements according to various classifications 322 upon conversion of the data structures 326 into a common canonical format by the format converter 350. The data analyzer 348 can establish one or more relationships between the normalized one or more entities (e.g., data structures) according to the canonical format. The data analyzer 348 can compare, using the schema 346 and the normalized one or more entities, attributes 324 of the electronic document 306 with attributes 324 of one or more documents corresponding to one or more different client accounts. The one or more documents of the different client accounts can be associated with the same classification 322 as the data element or data structure 326 associated with the attribute 324 being compared.

Data analyzer 348 can generate, based on the one or more relationships and comparison of the attribute 324 of the document 306 and the attributes of one or more prior documents of other electronic accounts of the same classification 322, a parameter (e.g., output determination) for the extracted data element (e.g., data structure 326) based on a reference to one or more data elements of the same classification in other documents of the different client accounts. The network interface 336 can communicate between the data processing system and the client device and provide, for display on the client account, the parameter (e.g., the output) for the extracted data element. The parameter can correspond to a grade, a score or a recommendation with respect to a particular data element (e.g., data structure) of the document 306 in comparison with other related data elements (e.g., data elements of the same classification) in other documents of other client accounts.

As described herein, canonical format can mean a standardized representation of a data element that is independent of the source document's original formatting. The system actively normalizes extracted values into the canonical format so that equivalent information from different documents can be directly compared by a processor. For example, the canonical format for a date may follow the ISO-8601 standard (YYYY-MM-DD), the canonical format for currency values may use a designated base currency (e.g., USD) with two decimal places, and the canonical format for units of measure may follow SI units (e.g., meters, kilograms), applying defined conversion factors from other systems of units where required.

As described herein, parameter can refer to a computed value generated from one or more normalized data elements and associated relationships. A parameter may take the form of a numerical score, a percentile rank, a categorical grade (such as "A," "B," "C"), or a recommendation string. Parameters are generated by the data analyzer module through comparison, deviation, or trend analysis against one or more reference datasets. For example, a parameter could be a "Contract Competitiveness Score" calculated by measuring deviation of a contract's pricing terms from the median pricing in similar contracts.

As described herein, mapping rules can mean transformation logic that converts extracted, raw values into standardized values within predefined sets. Mapping rules may include look-up tables, pattern-based substitutions, enumerated list matching, or algorithmic conversions. For example, a mapping rule can normalize the string "monthly billing" or "per month" into the standardized enumeration value MONTHLY. Mapping rules can also include corrective logic, such as filling missing values when they can be derived from related data elements.

As described herein, rule set can be a defined collection of mapping rules and validation conditions applied by the transformation functions to a set of data elements according to the selected extraction plan. A rule set may also include quality checks, acceptable range thresholds, and corrective actions triggered when extracted data does not meet expected constraints.

As described herein, schema can refer to a structured data model that defines the entity types, attributes, and relationships used in the system's canonical data representation. The schema enables consistent association and normalization of extracted data elements. For example, the schema may define entity types such as Contract, Product, SKU, Tier, Add-On, and Acceptable Range, with associated attributes and keys for relational linking.

As described herein, extraction plan can be a configuration specifying the prompts, mapping rules, schema references, and classification handling for extracting and processing data from documents of a given type or classification. Extraction plans may be predefined for known document types (e.g., SaaS contracts, purchase orders) or generated dynamically based on classification results.

Each one or more of the extraction functions 330, transformation functions 332 and augmentation functions 334 can utilize one or more AI models 316 that can be trained on various data or documentation to implement functionalities. Each one of the extraction functions 330, transformation functions 332 and augmentation functions 334 can utilize prompt functions 314 to focus, direct or control the processing of the AI models 316 to perform aspects or actions of the data processing system 310. The data processing system 310 can utilize the network interface 336 to provide the output products, such as performance parameters for the document, to the client device 302, via the user interface 304.

The data processing system 310 can be configured to process unstructured documents 306, such as contracts, service agreements, purchase orders, statements of work, service-level agreements (SLAs), data sheets, technical documents, service or product proposals or any other texts. The data processing system 310 can be configured to process such documents by extracting structured data through a series of automated functions. The solution is architected to be modular, allowing for flexibility in extracting various data points and adapting to different document types through configurable extraction plans.

The client device 302, which could be any user-facing machine (such as a laptop, server, or mobile device), can initiate the process by making an API call for document extraction and processing to a data processing system 310 (e.g., via a UI 304). This API call can include a document 306 to be processed, such as a PDF or a link to such a document. The API call can identify an extraction plan tailored to the user's preference (e.g., top-level data, line items, or term extraction). The document 306 can be uploaded to the data processing system 310 via a secure network connection, utilizing protocols for document handling, such as providing a pre-signed URL for efficient transfer. The client device 302 can specify where it would like to receive results (e.g., store in a storage 320 or provide via an application for sending real-time data, such as Webhook. Once the extraction begins, the data processing system 310 can assign a unique job ID to track progress.

Once the document is received by the data processing system 310, the extraction can be performed in three phases: extraction phase which can be implemented using extraction functions 330, transformation phase which can be implemented using a transformation functions 332, and augmentation phase which can be implemented using augmentation functions 334.

The extraction functions 330 can implement the first phase in which the data processing system 310 can leverage one or more services for optical character recognition (OCR) to convert the document 306 into machine-readable text. Once the OCR is complete, this text can be passed through multiple artificial intelligence (AI) models 316, which can use specially designed prompts generated by prompt functions 314 to extract specific information from the document 306 based on the chosen extraction plan. For example, in a SaaS contract, the system can extract product names, pricing terms, or contract length. This prompt-driven extraction can allow the data processing system 310 to handle complex documents with high accuracy and minimal manual input.

The extraction function 330 can include a classification functionality to classify document elements (e.g., data structures) based on their content. For example, extraction function 330 can identify a classification 322 for a particular term of an incoming document 306. The classification 322 can include a type of a particular entity corresponding to a data structure 326.

As such, the extraction functions 330 can actively acquire structured and semi-structured information from received electronic documents by executing a multi-stage identification and parsing process. The extraction functions 330 can obtain a machine-readable text layer from the document, such as by invoking an optical character recognition engine when the document lacks embedded text. The extraction functions 330 can then segment the text into logical sections, sentences, or tokens, and apply classification rules to identify portions of the document that match the target classification defined in the extraction plan. Using prompts retrieved from the selected prompt set, the extraction functions 330 can direct one or more artificial intelligence models to identify and extract specific attributes such as contract start dates, product identifiers, pricing terms, or line-item descriptions. The extraction functions 330 can tag each extracted value with an associated entity reference from the system schema, such as "contract term" or "SKU code." The extraction functions 330 can preserve positional metadata, including page numbers, paragraph indices, and table locations, to maintain traceability between the extracted data elements and the original document. When multiple occurrences of a data element are found, the extraction functions 330 can apply disambiguation routines to select or merge values based on context. This active extraction process produces a structured interim dataset that the transformation functions 332 can then standardize and normalize A data structure 326 can be a defined organizational format within a system that stores and represents extracted information from a document 306 in a structured and accessible manner. For example, a data structure 326 can represent a particular document entity (e.g., a contract entity or a term) and include fields for attributes, such as contract start date, total contract value, and discount percent, thereby linking each attribute to its corresponding entity for further processing, normalization, and analysis.

An attribute 324 can be a specific property, field, or characteristic associated with a data structure 326 or an entity extracted from a document 306. Attributes represent the individual pieces of information that define or describe the entity, such as a contract's start date, a product's price, or a SKU's identifier. For example, in the context of a contract document 306, a data structure 326 representing a contract entity may include attributes 324 such as "contract start date," "contract end date," "total contract value," and "discount percent." These attributes are used by the system to organize, normalize, and compare information across multiple documents and client accounts.

A classification 322 can be a label or category assigned to at least a portion of a document 306, indicating the type or nature of the document for processing purposes. Classifications 322 enable the system to select appropriate extraction plans, prompts, and rules tailored to the document's content. For instance, a classification 322 may be defined as "contract," "invoice," "statement of work," or "technical specification." When a document 306 is classified as a "contract," the system applies extraction and analysis procedures specific to contract documents, ensuring that relevant attributes 324 are identified and processed according to the requirements of that classification.

The transformation functions 332 can take the data from the extraction phase to implement various cleaning and standardization processes. The transformation functions 332 can implement tasks such as string cleanup (removing extra spaces or characters), canonicalization (mapping extracted values to a predefined format), and applying specific rules based on the overall extraction context. The transformation functions 332 can implement AI-based or rules based processing to verify that data is consistent, accurate, and ready for further processing in the next phase.

The transformation functions 332 can actively process the data elements immediately after extraction to ensure that each element conforms to a consistent, machine-comparable form. The transformation functions 332 can receive extracted values from the extraction functions 330 and apply a set of mapping rules from the selected extraction plan to convert these values into predefined categories, enumerated lists, or standardized formats. The transformation functions 332 can clean the data by removing non-textual characters from string values, normalizing whitespace, and correcting common recognition errors from optical character recognition. The transformation functions 332 can convert dates into a uniform canonical format, such as ISO-8601, and standardize numerical units by applying predefined conversion factors. They map extracted product names, contract terms, or pricing structures to unique identifiers held in a system schema, thereby linking each element to its associated entity type. The transformation functions 332 can apply rule-based logic to supplement missing values when derivable from related attributes—for example, computing a contract end date from a start date and term length—and to correct inconsistencies such as mismatched currency symbols and amounts. The transformation functions 332 can update the normalized data elements in real time, ensuring that subsequent augmentation, relationship-building, and comparison operations use a coherent and validated dataset.

The augmentation functions 334 can augment the data with additional metadata specific to the processing of the data processing system 310. This can include mapping the extracted information to unique identifiers such as company names, product IDs, product tiers, or add-on IDs. These mappings can be used for integrating the extracted data with other systems and documents 328 that were previously processed and analyzed by the data processing system 310. This can allow the data processing system 310 to verify that the data can be used effectively for downstream processes like contract analysis, product tracking, and customer management.

The augmentation functions 334 can actively enrich normalized data elements by associating them with additional identifiers, metadata, and contextual information drawn from internal and external data sources. The augmentation functions 334 can receive normalized entities from the transformation functions 332 and query predefined reference datasets, such as a client-specific SKU catalog, pricing tiers, product add-ons, or acceptable range records. They map each normalized element to corresponding identifiers, including company IDs, supplier IDs, product tier codes, and industry classification codes, ensuring consistent entity linkage across documents. The augmentation functions 334 can supplement each data element with contextual attributes, such as historical average price, currency conversion rates, or applicable discount ranges, retrieved from secure internal databases or authorized third-party APIs. The augmentation functions 334 can also incorporate business-specific metadata, including contract version numbers, geographic service regions, and applicable compliance classifications. When discrepancies between augmented data and normalized data arise, the augmentation functions 334 can apply validation logic to flag anomalies for potential human review. This enrichment step can creates a semantically rich dataset that the data analyzer can use to establish relationships, perform deviation analysis, detect temporal trends, and generate meaningful grades, scores, or recommendations.

Accordingly, the data processing system executes a continuous three-phase pipeline in which the extraction functions 330, transformation functions 332, and augmentation functions 334 operate in sequence to convert an unstructured electronic document into an enriched, analysis-ready dataset. In the first phase, the extraction functions 330 convert incoming documents into a machine-readable form, segment the content into logical units, classify relevant portions according to the selected extraction plan, and direct artificial intelligence models to capture specific attributes and tag them with initial entity types from the system schema. Immediately upon completion of each extraction task, the transformation functions 332 receive the structured interim dataset and actively normalize its contents. They apply mapping rules from the extraction plan to clean string data, correct OCR artifacts, convert units and date formats to a canonical standard, and map extracted values to predefined sets, thereby ensuring that each data element is both internally consistent and comparable across the document corpus. Once normalized, the dataset flows directly into the augmentation functions 334, which actively enrich the data by linking each entity to external or internal reference identifiers, attaching relevant metadata such as SKUs, product tiers, or discount bands, and appending contextual values including historical benchmarks or compliance categories. Each phase delivers its output in a format that the next phase consumes without additional preprocessing, enabling a fully automated, low-latency path from raw document ingestion to actionable intelligence. By chaining these three specialized functions in a tightly integrated sequence, the system achieves high accuracy, consistent data representation, and immediate readiness for downstream analytics such as cross-document comparison, anomaly detection, and parameter scoring.

Implementing the extraction functions 330, transformation functions 332, and augmentation functions 334 as a coordinated three-phase pipeline provides significant technical advantages over conventional document processing approaches. The pipeline reduces end-to-end latency by eliminating redundant preprocessing between stages and by passing normalized and validated data directly from one phase to the next without intermediate file conversions. By performing classification-driven extraction before normalization, the system reduces compute cycles consumed by irrelevant text, lowering processor utilization and memory footprint. The transformation functions 332 improve system interoperability by enforcing a canonical representation for dates, units, and identifiers, enabling heterogeneous downstream systems to consume the results without additional format mapping. The augmentation functions 334 enhance analytic accuracy by appending authoritative reference identifiers and metadata, which allows the data analyzer to perform more reliable cross-document comparisons and anomaly detection. Streaming partial results from the extraction and transformation phases enables near-real-time feedback to client devices, which can shorten decision-making cycles in business workflows. Furthermore, the modular design allows independent scaling or upgrading of each stage—for example, deploying a more capable AI model in the extraction phase without altering transformation or augmentation logic-thereby increasing the maintainability and adaptability of the system in multi-tenant cloud environments.

The network interface 336 can support multiple mechanisms for retrieving results, which can be asynchronous or synchronous depending on the nature of the extraction plan chosen. As the extraction process progresses, the network interface 336 can send the partial results back to the client via the specified URL (e.g., a URL of a data sharing application, such as Webhook) allowing for real-time updates. Alternatively, client device 302 can poll the results endpoint to retrieve the complete dataset once all phases of the extraction are finished. Each of these options is designed to offer flexibility, enabling use cases where users either wait for results in an interactive session (online mode) or retrieve them in bulk for later processing (offline mode). The overall time for completing an extraction can vary based on several factors, including the size of the document 306, the specific extraction plan that is selected, and the document's content complexity. Depending on the design, the performance can fluctuate due to process dependencies and network congestion.

Data processing system 310 can include any combination of hardware and software for providing an automated data extraction and management of unstructured documents using a classification framework. Data processing system 310 can include computer code, functions, data and instructions stored in a memory 125 or storage 120 and configured to be accessed by one or more processors 115 to implement any functionalities associated with data processing system 310. Data processing system 310 can be implemented on a computing device, such as a server implemented in a computing system 100, one or more physical or virtual devices or a cloud-based environment, such as the cloud of example 200 in FIG. 2.

Data processing system 310 can communicate via one or more client devices 302 via communication links 308. A communication link 308 can include any combination of wired or wireless connections for exchanging communications or data between the client device 302 and the data processing system 310. A communication link can include a wireless connection between the devices, such as a wireless local area network (WLAN) connection (e.g., via a Wi-Fi router), or a connection via a cellular network, such as a network 205, or the internet.

A client device 302 can be any computing device, such as a personal computer or a workstation that a user (e.g., employee of the enterprise) can use to access a user interface 304. User interface 304 can include any computing interface (e.g., a website, a web page, a chatbot, or any graphical user interface having a selection of menus and options) that the user can access and use, via the client device 302, to access the data processing system 310 and provide the document 306 and any associated API calls, extraction plans or other information.

Prompt function 314 can include any combination of hardware and software that can be used to create a prompt for an AI model 316. A prompt can include any text, including a series of characters, instructions or data, which can instruct an AI model 316 to operate with a particular focus, context or instruction. Prompts can include specific inputs or instructions (e.g., or a set of instructions) that can influence, specify, adjust or guide the output of the AI model 316 by providing or indicating context, constraints or desired outcome (e.g., desired type, form of output). The prompt function 314 can include or provide instructions, functions or computer code or data for generating a prompt.

AI models 316 can include any type and form of artificial intelligence or machine learning models for extracting and processing data. AI model 316 can include a generative Artificial Intelligence (GAI) model, which can be designed to generate content or new content, such as text, images, or code, by learning patterns and structures from existing data. AI model 316 can be any model, a computational system or an algorithm that can learn patterns from data (e.g., chunks of data from various input documents, computer code, templates, forms, etc.) and make predictions or perform tasks without being explicitly programmed to perform such tasks. AI model 316 can refer to or include a large language model. AI model 316 can be trained using a dataset of documents (e.g., text, images, videos, audio or other data). AI model 316 can be designed to understand and extract relevant information from the dataset. AI model 316 can leverage natural language processing techniques and pattern recognition to comprehend the context and intent of the prompt, match it with relevant information in the training data, and generate a response that addresses the query.

AI model 316 can be built using deep learning techniques, such as neural networks, and can be trained on large amounts of data. AI model 316 can be designed, constructed or include a transformer architecture with one or more of a self-attention mechanism (e.g., allowing the model to weigh the importance of different words or tokens in a sentence when encoding a word at a particular position), positional encoding, encoder and decoder (multiple layers containing multi-head self-attention mechanisms and feedforward neural networks). For example, each layer in the encoder and decoder can include a fully connected feed-forward network, applied independently to each position. The data processing system 310 can apply layer normalization to the output of the attention and feed-forward sub-layers to stabilize and improve the speed with which the AI model 316 is trained. The data processing system 310 can leverage any residual connections to facilitate preserving gradients during backpropagation, thereby aiding in the training of the deep networks. Transformer architecture can include, for example, a generative pre-trained transformer, a bidirectional encoder representations from transformers, transformer-XL (e.g., using recurrence to capture longer-term dependencies beyond a fixed-length context window), text-to-text transfer transformer, etc.

AI model 316 can be trained (e.g., by a model training function) using any text-based dataset by converting the text data from the input dataset documents into numerical representations (e.g., embeddings) of the chunks of those documents. These embeddings can capture the semantic meaning of words, paragraphs, pages or sentences, depending on the size and type of chunks the dataset documents are parsed into. Embeddings can be used to represent and organize the dataset documents within a high-dimensional space (e.g., embedding space), where similar documents or concepts are located closer together. Embedding space can include a multi-dimensional vector space where each data point is represented by an embedding.

Through training, including via prompts from prompt functions 314, the AI model 316 can learn, or adjust its understanding of mapping the embeddings to issues (e.g., particular types of template outputs, particular form related functionalities, placeholder and variable relations and more), by adjusting its internal parameters. Internal parameters can include numerical values of the AI model 316 that the model learns and adjusts during training (e.g., and in response to prompts 325) to optimize its performance and make more accurate predictions. Such training can include iteratively presenting the various data chunks or documents of the dataset (e.g., or their chunks, embeddings) to the AI model 316, comparing its predictions with the known correct answers, and updating the model's parameters to minimize the prediction errors. By learning from the embeddings of the dataset data chunks, the AI model 316 can gain the ability to generalize its knowledge and make accurate predictions or provide relevant insights when presented with prompts.

AI model 316 configured as GAI models can include any ML or AI model or a system that can learn from a dataset to generate new content (e.g., text or images) that resembles a distribution of the training dataset. A distribution of a dataset can include an underlying probability distribution representing the patterns and characteristics of the data used to train an AI model 316. For example, a training data distribution can represent statistical properties of a text data (e.g., text corpus), such as the frequency of words, the co-occurrence of terms, and the overall structure of the language used in the training dataset. AI model 316 can include the functionality to utilize such a probability distribution of patterns and characteristics to generate new responses (e.g., predictions) that were not present in the dataset.

Stored in the storage 320, the extraction plan 340 can be any structured configuration that specifies the procedures and parameters for extracting data elements from an electronic document 306. Each extraction plan 340 can include a set of rules or rule sets 342, a set of prompts or prompt sets 344, and schemas 346, which can collectively define how the document 306 is to be processed. The extraction plan 340 can be selected based on the classification 322 of the document or user input from the client device 302. For example, an extraction plan 340 for a document 306 that is classified (e.g., classification 322) as a contract may specify or involve a particular set of prompts for extracting contract terms, as well as rule sets 344 for normalizing elements such as date formats, and a schema 346 for mapping extracted terms to contract entities. The extraction plan 340 can facilitate the data processing system to flexibly adapt to different document types and user requirements, ensuring that relevant data elements are accurately and consistently extracted, transformed, and mapped.

Rule sets 342 can include any set or collection of transformation or normalization rules used by the extraction functions 330 and transformation functions 332 to process extracted data elements (e.g., data structures 326). Rule sets 342 may include, for example, rules for cleaning string values, converting date formats, mapping values to enumerated categories, and correcting or filling in missing data fields. Rule sets 342 can be tailored to the requirements of each extraction plan 340 and may be updated or extended as new document types or data structures are introduced. By applying rule sets 342, the system ensures that extracted data elements are standardized and compatible with the canonical format defined by the schema 346, enabling reliable comparison and analysis across documents and client accounts.

Prompt sets 344 can include any group or collections of structured instructions, queries, or templates that are used to guide artificial intelligence (AI) models 316 during the extraction of data elements from unstructured documents. Each prompt within a prompt set 344 is designed to elicit specific information from a document 306, such as identifying product names, contract terms, pricing details, dates, or other relevant attributes. Prompt sets 344 can be tailored to different document types, classifications 322, or user requirements, and are selected as part of the extraction plan 340. The prompts may be formulated to address context-dependent language, domain-specific terminology, or particular formatting challenges present in the document. By leveraging prompt sets 344, the system 300 allows for the AI models 316 to perform targeted extraction tasks with high accuracy, ensuring that relevant data elements are identified even in documents with complex or variable structures.

Schemas 346 can include structured data sets or models that define the organization, relationships, and canonical formats for entities and attributes of various documents 306. A schema 346 can specify how extracted data elements are mapped to entities such as products, SKUs, contract terms, dates, names, or client accounts, and how these different entities are interrelated (e.g., relationships between the entities). Schemas 346 can provide rules for normalization, ensuring that data elements from diverse documents are converted into a consistent format suitable for comparison and analysis. This includes specifying data types, permissible values, and the relationships between entities (for example, linking a product entity to its associated SKU, tier, or add-on records). Schemas 346 can be referenced by transformation functions 332, format converter 350, and data analyzer 348 to enable accurate association, normalization, and comparison of data elements across documents and client accounts. By maintaining a consistent structure for all processed data, schemas 346 support the system's ability to establish relationships, perform cross-document analytics, and generate actionable outputs such as grades, scores, or recommendations.

Format converter 350 can include any combination of hardware and software for converting extracted and transformed data elements between different formats, such as converting various formats of various documents into a common canonical format, and as needed, vice versa. The format converter 350 may operate on documents 306 or data structures 326 produced by transformation functions 332, applying rule sets 342 and schemas 346 to ensure that all data elements are represented in a standardized manner. This conversion can facilitate downstream processing by augmentation functions 334 and data analyzer 348, enabling accurate comparison, relationship establishment, and parameter generation. The format converter 350 may support multiple input and output formats, and allow the data processing system to process documents from diverse sources and deliver results in formats compatible with client requirements.

Data analyzer 348 can include any combination of hardware and software configured to analyze normalized data elements and entities, establish relationships, and perform cross-document comparisons. The data analyzer 348 can receive canonical data structures 326 (e.g., data structures converted into a common format) from the format converter 350 and utilize schemas 346 to identify features of, or relationships among, specific document entities and their attributes. The data analyzer 348 can compare attributes 324 of the electronic document 306 with attributes of documents 328 from other client accounts, using classification 322 to ensure relevant comparisons. Based on these relationships and comparisons, the data analyzer 348 can generate parameters for extracted data elements, such as grades, scores, or recommendations. The data analyzer 348 can also identify anomalies, outliers, or trends in the data, supporting advanced analytics and decision-making for the client device 302.

The data processing system 310 can be configured such that each component of the data processing system 310 operates in concert to perform the steps and functionalities recited in the claims. The client device 302 can transmit documents 306 to the data processing system 310, which can process the documents according to extraction plans 340 selected based on classification 322. Extraction functions 330 and transformation functions 332 can utilize prompt sets 344, rule sets 342, and schemas 346 to extract, transform, and normalize data elements, which are then converted to a canonical format by format converter 350. Augmentation functions 334 can improve the data to add additional metadata and identifiers. Data analyzer 348 can determine relationships among entities (e.g., data structures) and compare attributes across documents and client accounts to generate parameters such as grades, scores, or recommendations. For example, parameters generated by the data analyzer 348 can include quantitative or qualitative indicators that reflect how a particular contract term, price, or product feature compares to similar items in other documents or client accounts (e.g., is a price for a particular software service too high or too low in comparison with other contracts for the same or similar service). For instance, the grades provided by the data analyzer 348 can be used to indicate the overall strength or favorability of a contract or agreement, such as whether pricing terms are competitive or renewal clauses are advantageous. For example, the scores generated by the data analyzer 348 can provide a numerical assessment of how closely a document's attributes align with industry benchmarks or acceptable ranges. For example, recommendations may offer actionable guidance, such as suggesting renegotiation of certain terms, identifying opportunities for cost savings, or highlighting areas where a contract deviates from standard practices. The network interface 336 can communicate results to the client device 302 for display via the UI 304.

For example, when a contract document 306 is received, the extraction plan 340 for contracts can be selected by the extraction function 330 (e.g., using AI framework 312), specifying rule sets 342 for date normalization, prompt sets 344 for extracting contract terms, and a schema 346 for mapping terms to contract entities. Extraction functions 330 can extract relevant data elements, which are transformed and normalized by transformation functions 332 and format converter 350. Augmentation functions 334 can add metadata such as company and product identifiers. Data analyzer 348 can compare contract attributes with those of other contracts from different client accounts, establishes relationships, and generates a grade or recommendation for the contract terms. The output result can be communicated by the network interface 336 to the client device 302 for display, enabling informed decision-making and contract analysis.

Figure 4:
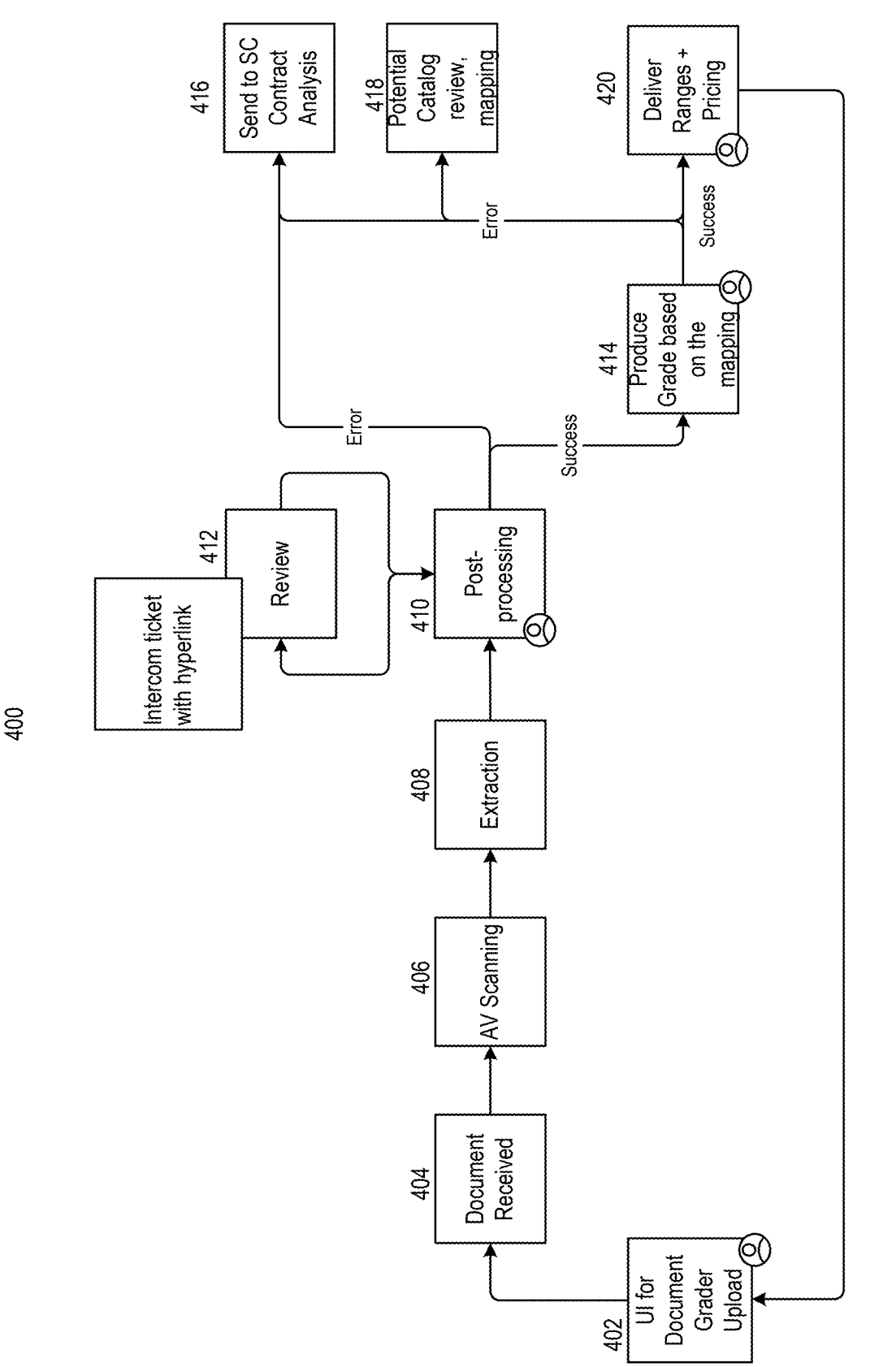
FIG. 4 shows an example flow diagram of a method for document data extraction and processing.

FIG. 4 illustrates an example flow diagram 400 of a method for document data extraction and processing. At 402 the UI for document grader upload or management is used. At 404, the document is received. At 406, anti-virus scanning is performed. At 408, extraction is performed. At 410, post-processing functions are implemented. At 412, human review is implemented. At 414, a grade or parameter is produced based on the mapping and acceptable range lookups (e.g., with respect to the parameters and attributes of other prior-processed documents). If the grade or parameters are subpar or outside of preferred or acceptable range, at 416 the process can be sent to contract analysis, or at 418 potential catalog review, mapping exercise or data refresh can be performed. At 420, if the grade or parameters are within the satisfactory range, the system can deliver the ranges and pricing to the UI of the document grader.

Figure 5A:
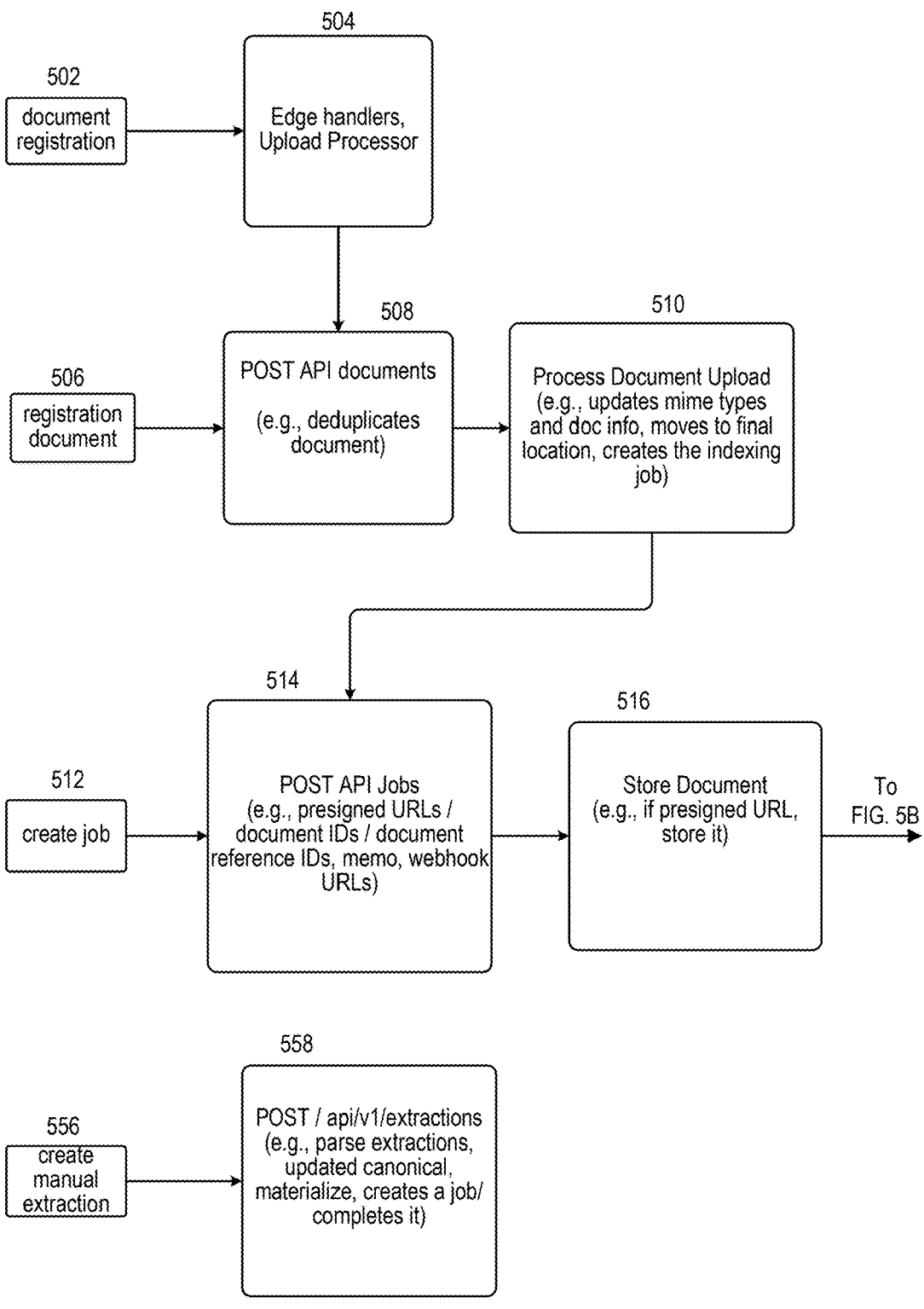
FIGS. 5A-5C show another example flow diagram of a method for document data extraction and processing.
Figure 5B:
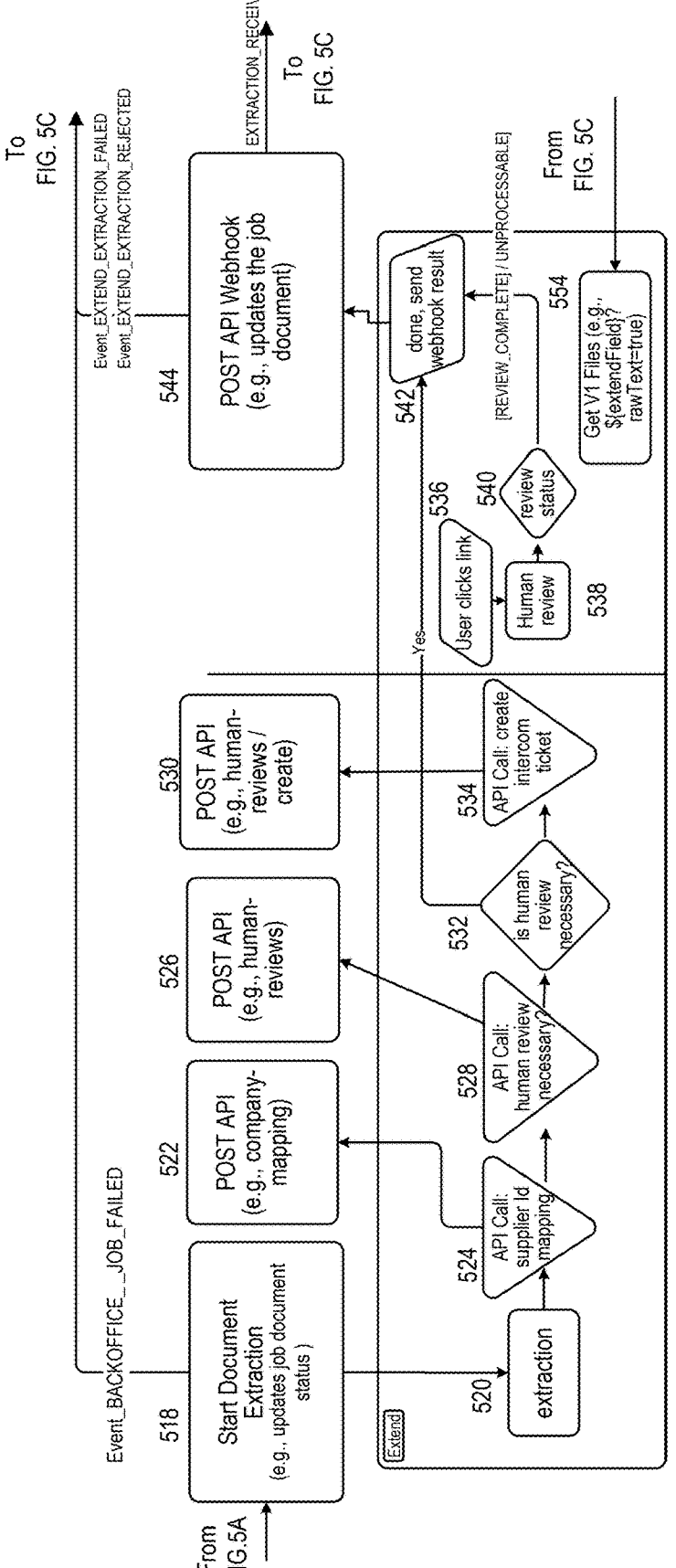
Figure 5C:
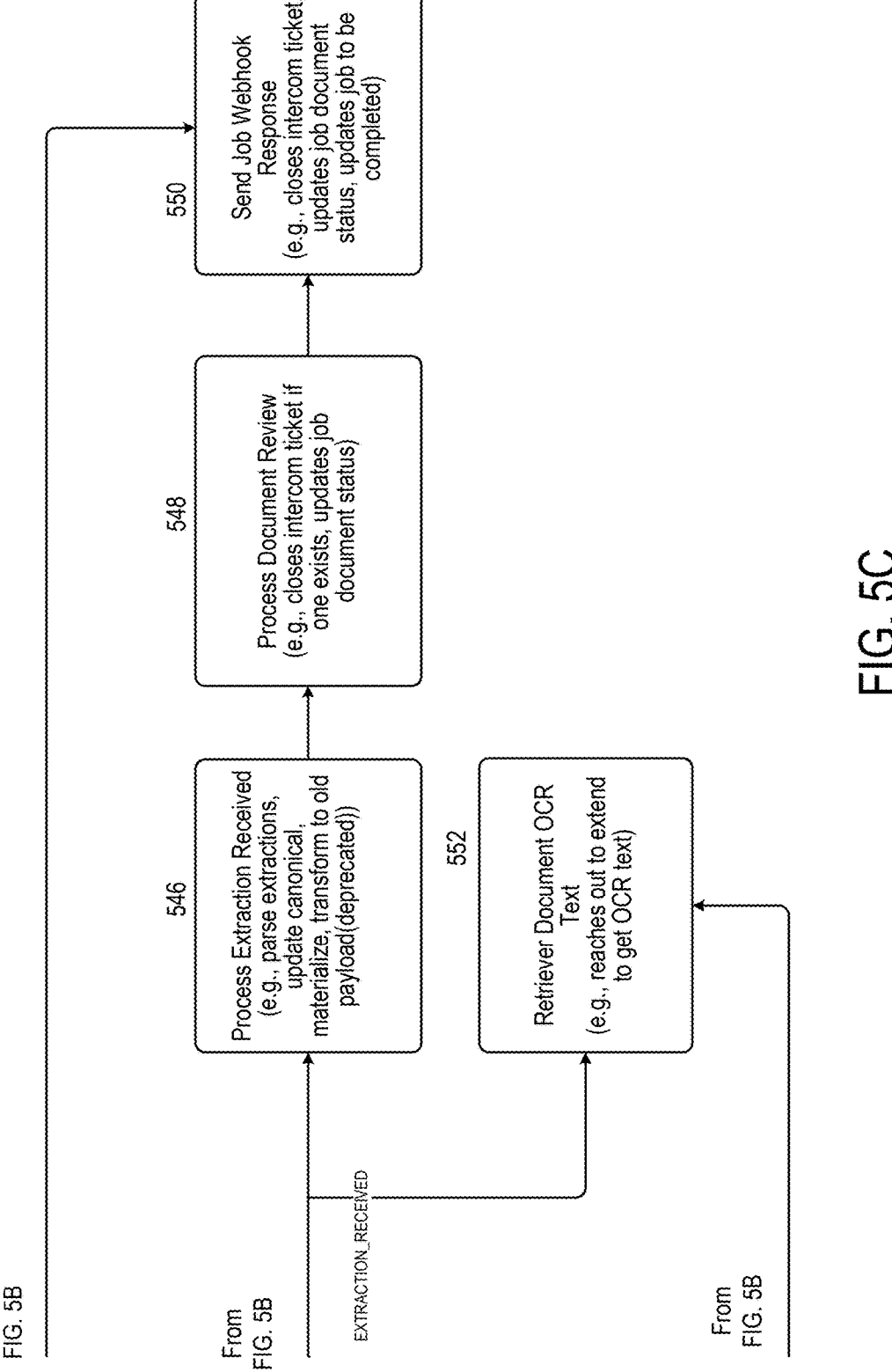

FIGS. 5A-5C illustrate another example flow diagram 500 of a method for document data extraction and processing. The flow diagram 500 can include acts 502-558, provided in FIGS. 5A, 5B and 5C, each one of which shows a portion of the flow diagram.

At FIG. 5A, example flow diagram 570 shows a first portion of the example flow diagram 500 of FIG. 5. At 502, document registration can occur at edge function. At 504, the data is uploaded to the processor. At 506, the document can be registered. At 508, the process can deduplicate the document. At 510, the process can upload the mime types and document information, move the document for anti-virus processing and create an indexing job identifier. At 512, the process can create a job (e.g., job ID). At 514, the process can create a metadata for the job as it started. At 516, the process can store a copy of the document. At 556, the process can create a manual extraction. At 558, the process can parse the extraction and create the metadata.

At FIG. 5B, example flow diagram 580 shows a second portion of the example flow diagram 500 of FIG. 5. At 518, the process receives output from 516 (e.g., at FIG. 5A) and makes the call to send the document for extraction processing. At 520, the process implements the extraction of the document data. At 522, a call for company data mapping is sent. At 524, the API call for supplier identifier and mapping is implemented. At 526, a determination for human review is made. At 528, the API call for human review is determined, if to be used. If at 532 a determination is made that the human review is to be implemented, at 534 an API call to create a ticket for human review is made and at 530 a human review process is started. At 536, a user can click a link in the ticket and at 538 a human review can be done. At 540, a review status can be provided. At 524, upon completion, results can be provided. At 544, results can be provided via links (e.g., webhook URLs). At 544, an output from act 552 at FIG. 5C is provided.

At FIG. 5C, an example flow diagram 590 shows a third portion of the example flow diagram 500 of FIG. 5. At 546, a process extraction can include parsing actions and data updates. At 548, the process can include closing of the ticket (e.g., for extraction) upon extraction completion. At 550, the process can update the status of the process and update the job as completed. At 552, the process can reach out to the extraction tool to receive OCR text.

Figure 6A:
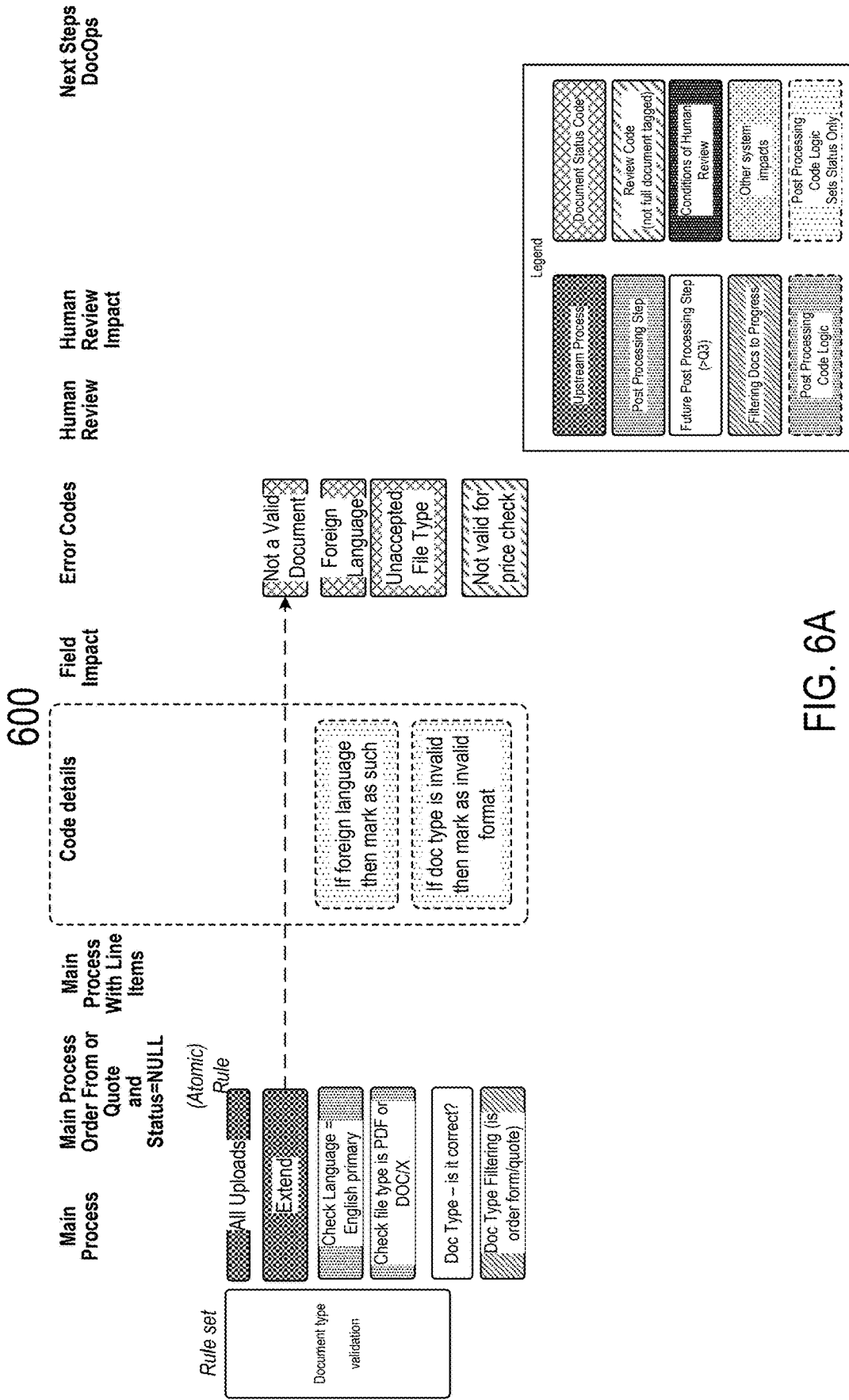
FIGS. 6A-6E show flow diagrams of various types of corrections and validations implemented in accordance with embodiments.

FIG. 6A illustrates an example flow diagram 600 for document type validation. The flow diagram 600 can include one or more processes, such as uploading, performing extraction, checking the language (e.g., for languages that are supported) and the file type of the document (e.g., for file types that are supported). The process can verify if the document type is correct and provide document type filtering. The process can issue error codes for languages and document types that are not supported.

Figure 6B:
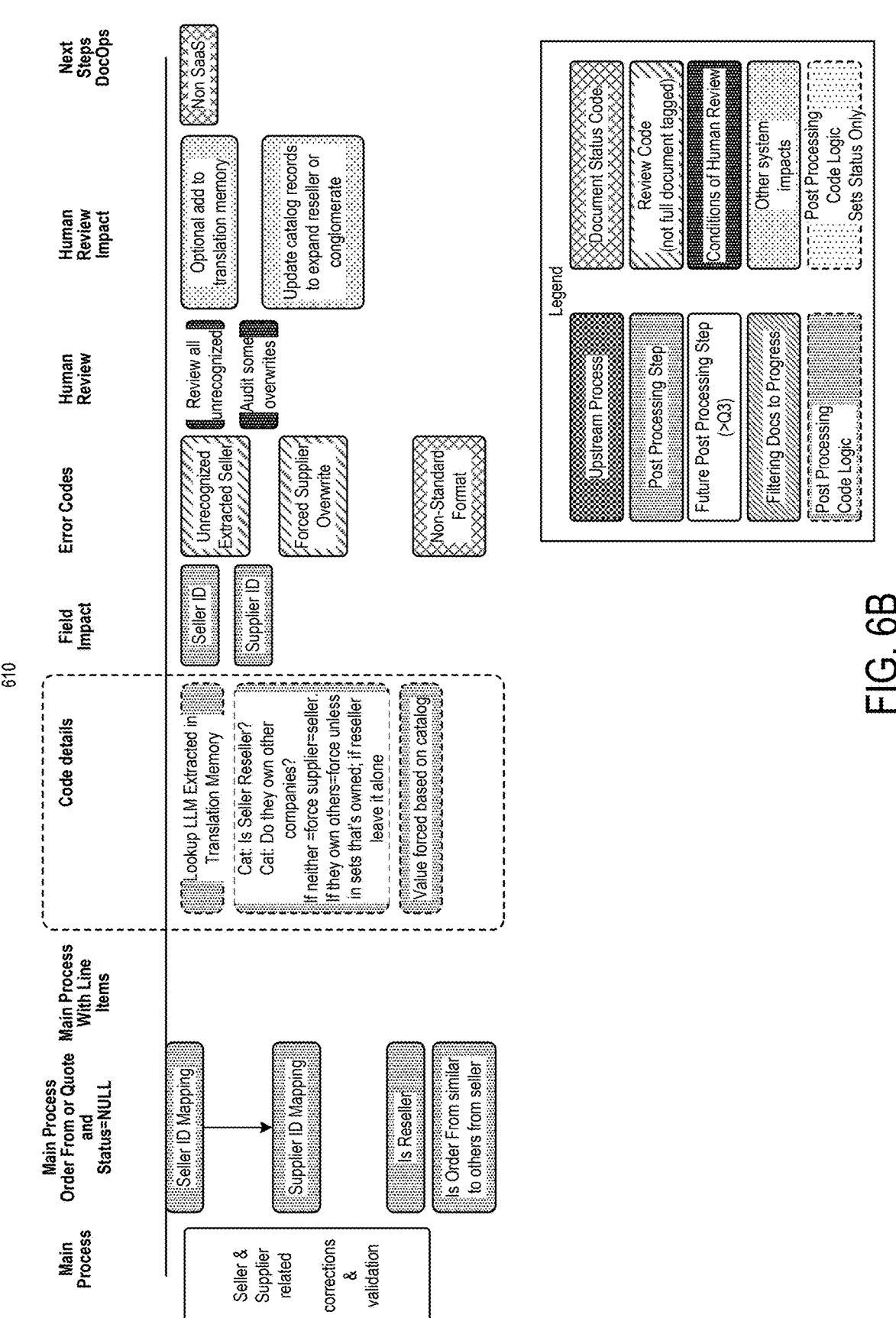

FIG. 6B illustrates an example flow diagram 610 for seller supplier related corrections and validation. The example process 610 can implement seller ID mapping and supplier ID mapping with prior stored data. The process can verify if the process concerns a reseller or if the order is similar to other orders from the seller. The process can verify seller and supplier identifiers and check if they are recognized.

Figure 6C:
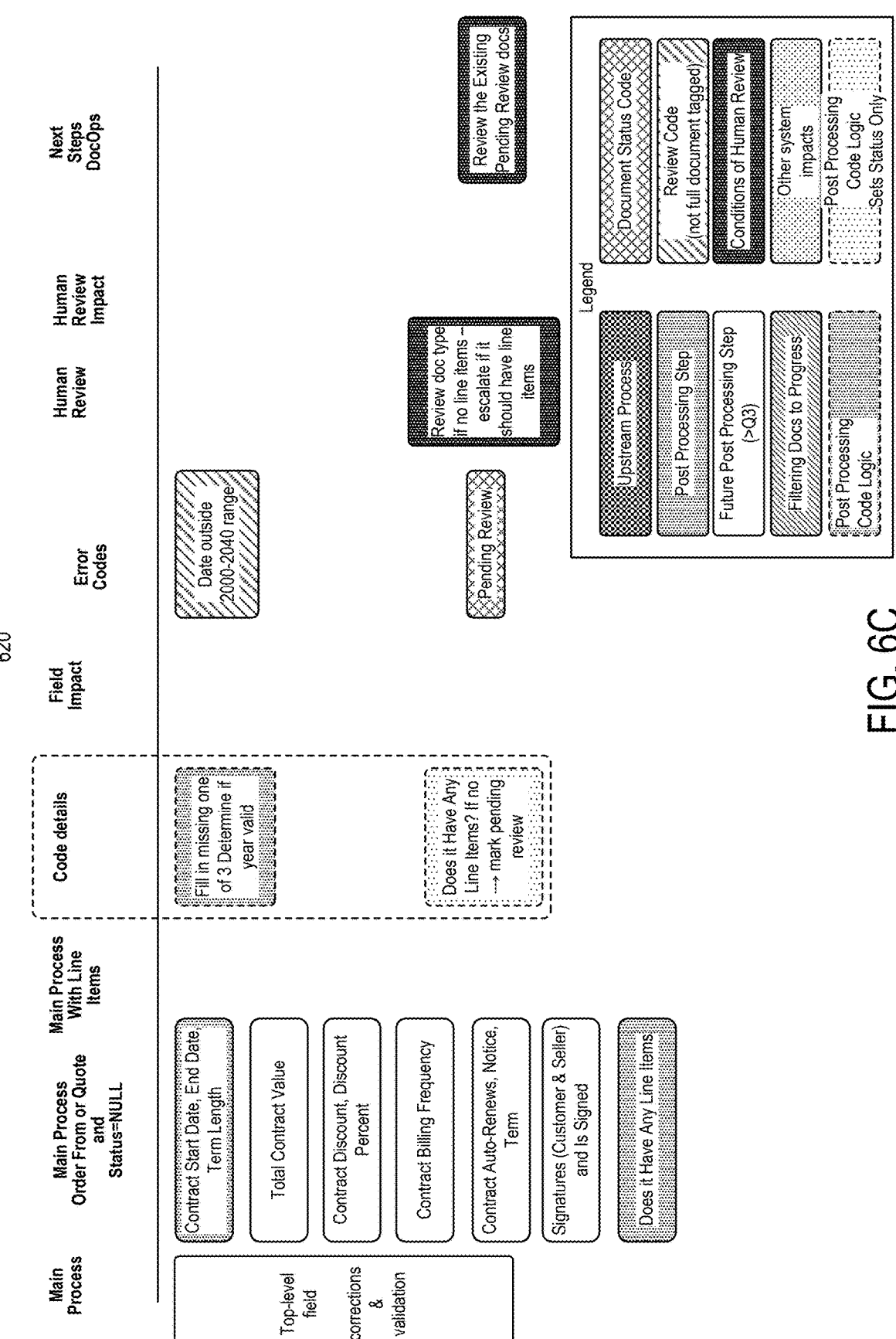

FIG. 6C illustrates an example flow diagram 620 of top-level field corrections and validations. The example process 620 can check for contract start and end dates and term length. The process can determine the total contract value, contract discount and discount percent, contract billing frequency, contract auto-renews, notice and terms, and can verify if there is a signature and if it has any line items.

Figure 6D:
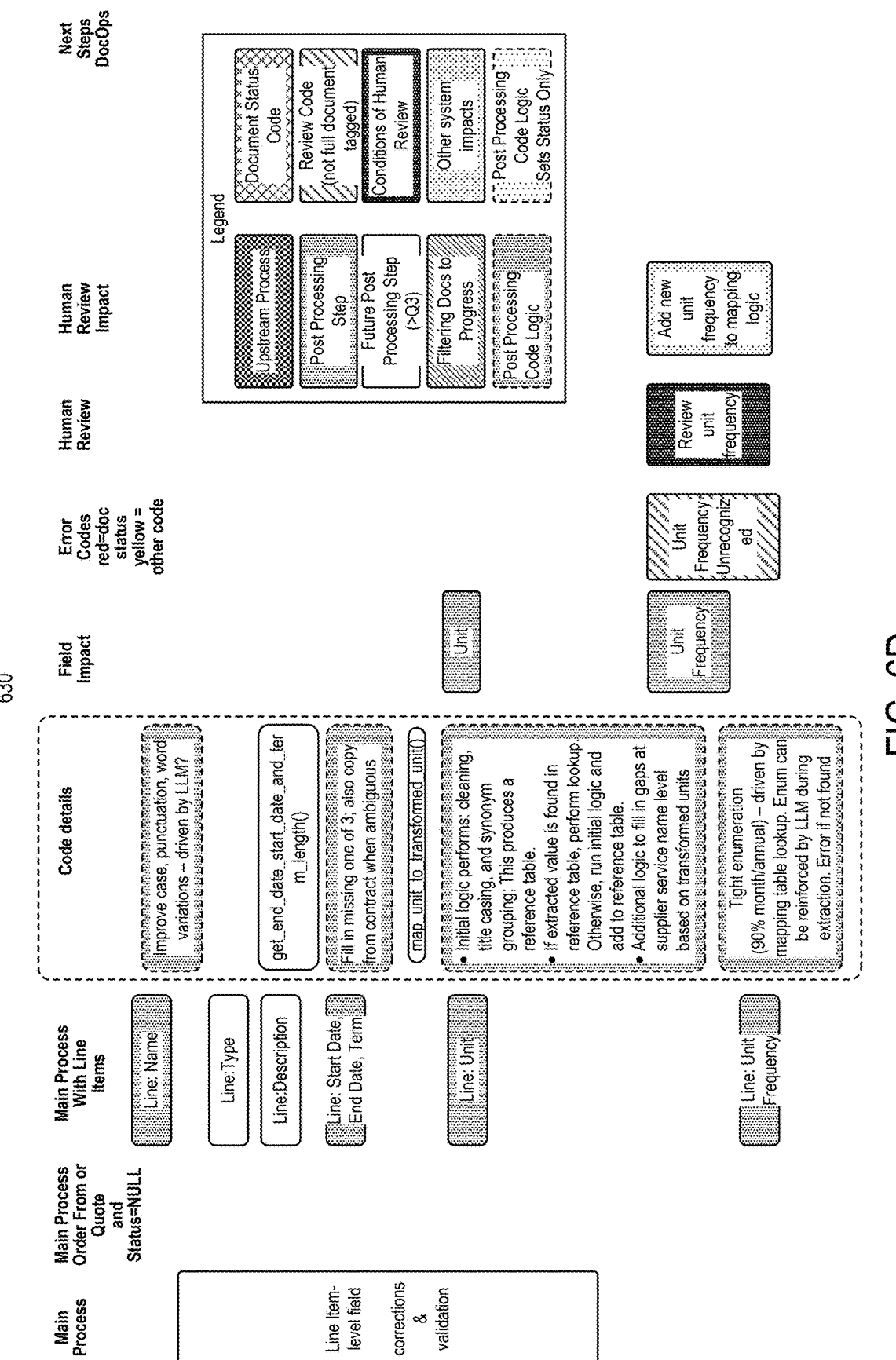

FIG. 6D illustrates an example flow diagram 630 of line item-level field corrections and validation. The example process 630 can check line items for name, type, description, start and end dates, units and unit frequencies. The process can check for punctuation and language using AI model (e.g., LLM) and fill in missing items (e.g., dates or entries).

Figure 6E:
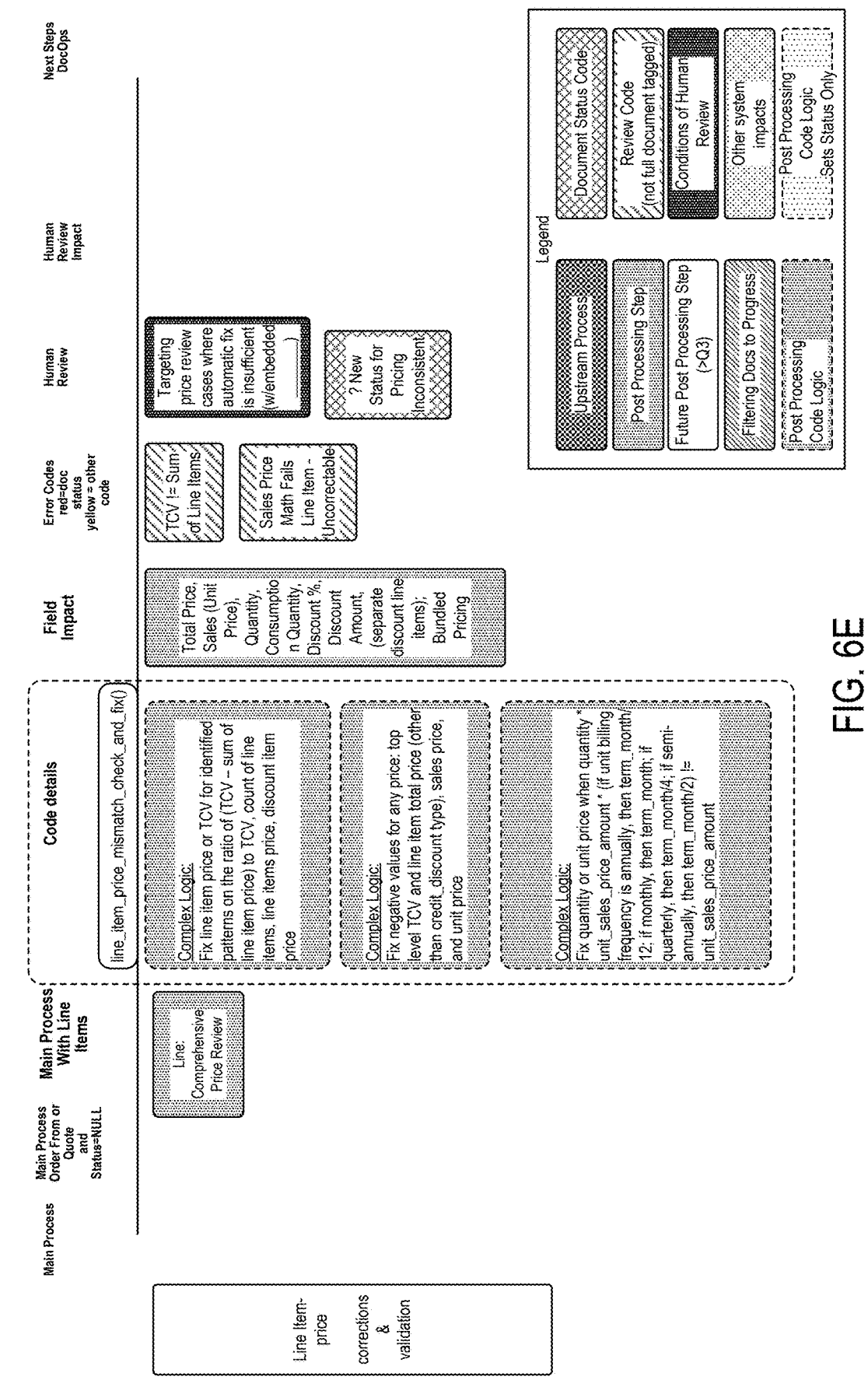

FIG. 6E illustrates an example flow diagram 640 for line item price corrections and validation. The example process 640 can implement a comprehensive price review. The process can fix line item price for identified patterns on the ratio of sum of line items, count of line items, line items price and discount item price. The process can fix negative values for any price.

Figure 7A:
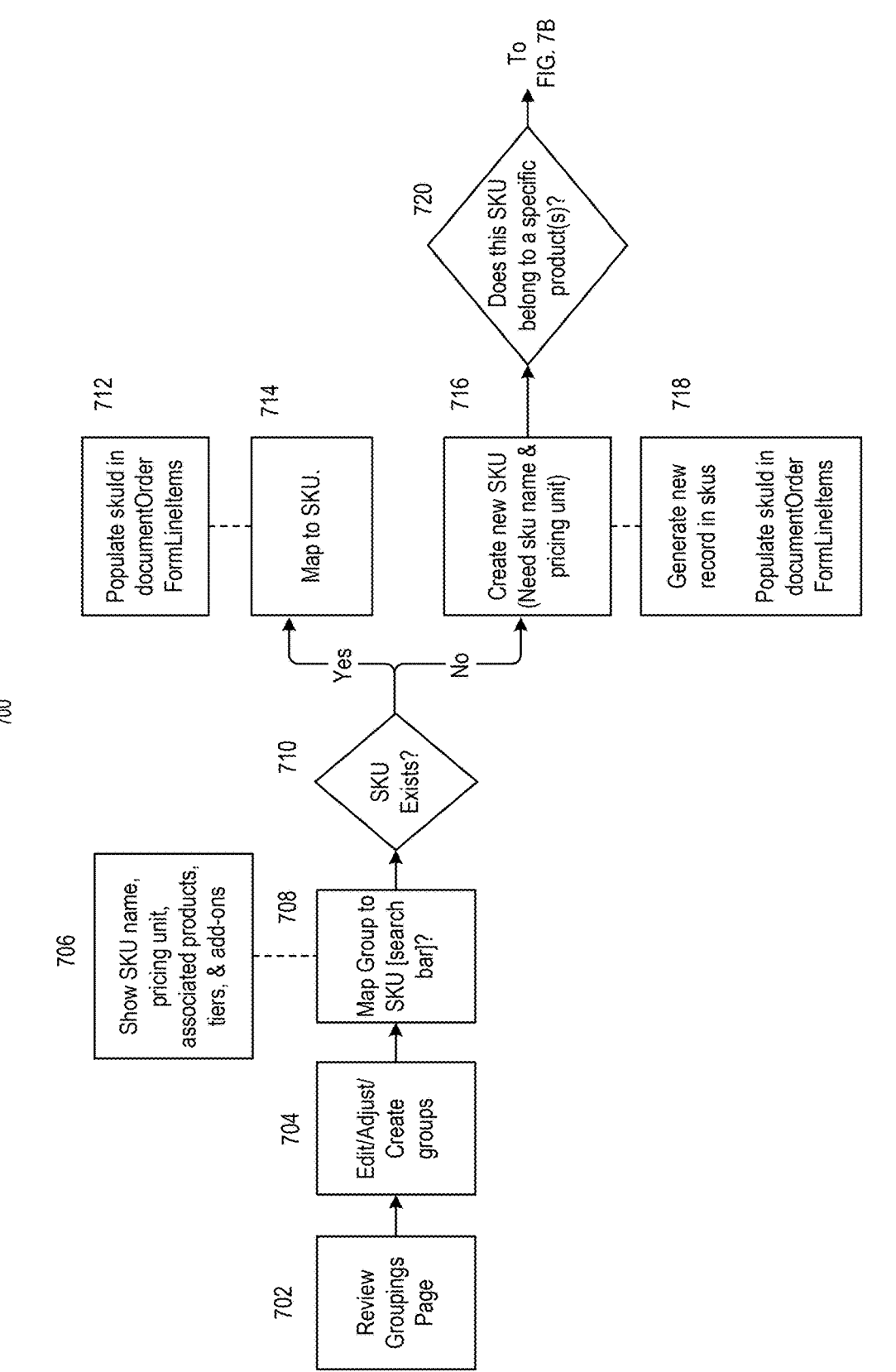
FIGS. 7A-7B relate to an example flow diagram of document data extraction and processing using stock keeping unit (SKU) information.
Figure 7B:
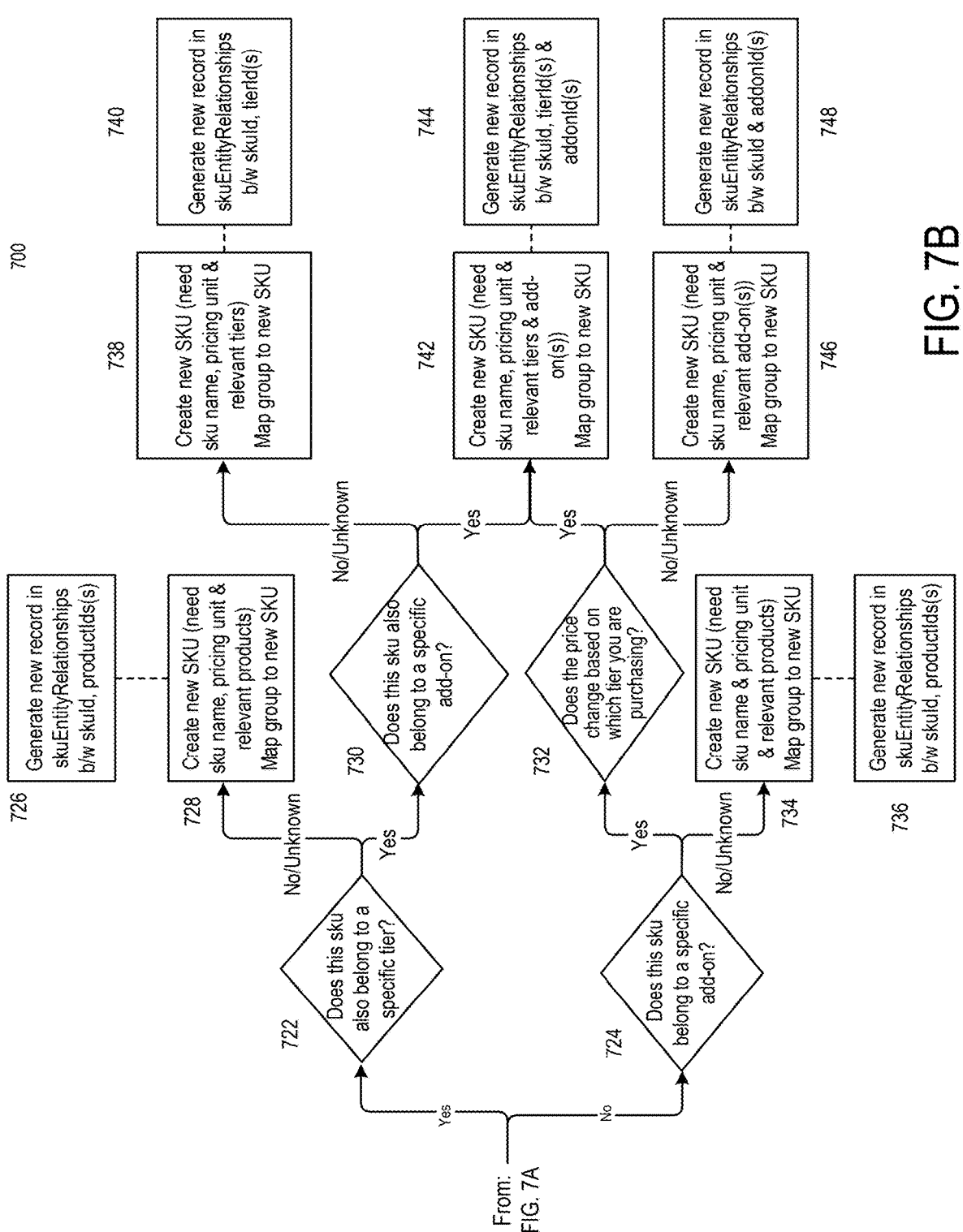

FIGS. 7A and 7B illustrate an example flow diagram 700 of document data extraction and processing using stock keeping unit (SKU) information. As shown in FIGS. 7A and 7B, a process 700 can include acts 702-748. At 702, the process can review a groupings page. At 704, the process can edit, adjust or create a group. At 706, the process can show SKU name, pricing unit, associated products, tiers and add-ons. At 708, the process can map the group to a SKU. At 710, the process can check if the SKU exists.

At 712, the process can populate SKU identifiers in document form line items. At 714, the process can map to the SKU if the SKU is determined to exist at 710. At 716, the process can create a new SKU if the SKU is determined not to exist at 710. At 718, the process can generate a new record in the SKUs. At 720, the process can determine if the SKU belongs to a specific product. If the answer at 720 is affirmative, at 722, the process can determine if the SKU also belongs to a specific tier. At 724, if the answer at 720 is negative, the process can determine if the SKU belongs to a specific add-on.

At 726, the process can generate a new record for the SKU. At 728, the process can create the new SKU and map a group to the new SKU. At 730, the process can determine if this SKU also belongs to a specific add-on. At 732, the process can determine if the price changes based on which tier is purchased. At 734, the process can create a new SKU and map the group to the new SKU. At 736, the process can generate new record for the SKU.

At 738, the process can create a new SKU and map the group to new SKU if the answer at 730 was negative or unknown. At 740, the process can generate a new record between the SKU identifier and the tier identifier. At 742, the process can create a new SKU and map the group to the new SKU if the answer at either 730 or 732 was in the affirmative. At 744, the process can generate a new record between SKU ID and tier ID and add-on ID. At 746, the process can create a new SKU and map the group to the new SKU if the answer at 732 was negative or unknown. At 748, the process can generate a new record in SKU entity relationships between the SKU ID and the add-on ID.

FIG. 8 illustrates an example screen shot 800 of a user interface providing results (e.g., parameters 802) of the data processing system analysis to a client device. For instance, the user interface (e.g., displayed on a client device) can be a graphical user interface (GUI) showing one or more output scores, plots, illustrations or animations of the performance parameters 802 associated with the document of the client in comparison with other similar documents and their corresponding parameters 802. For instance, a parameter 802 can include a score, a value or a data point in a plot of data points of other documents of the same classification to provide an illustration of a comparison to the viewer.

Figure 9:
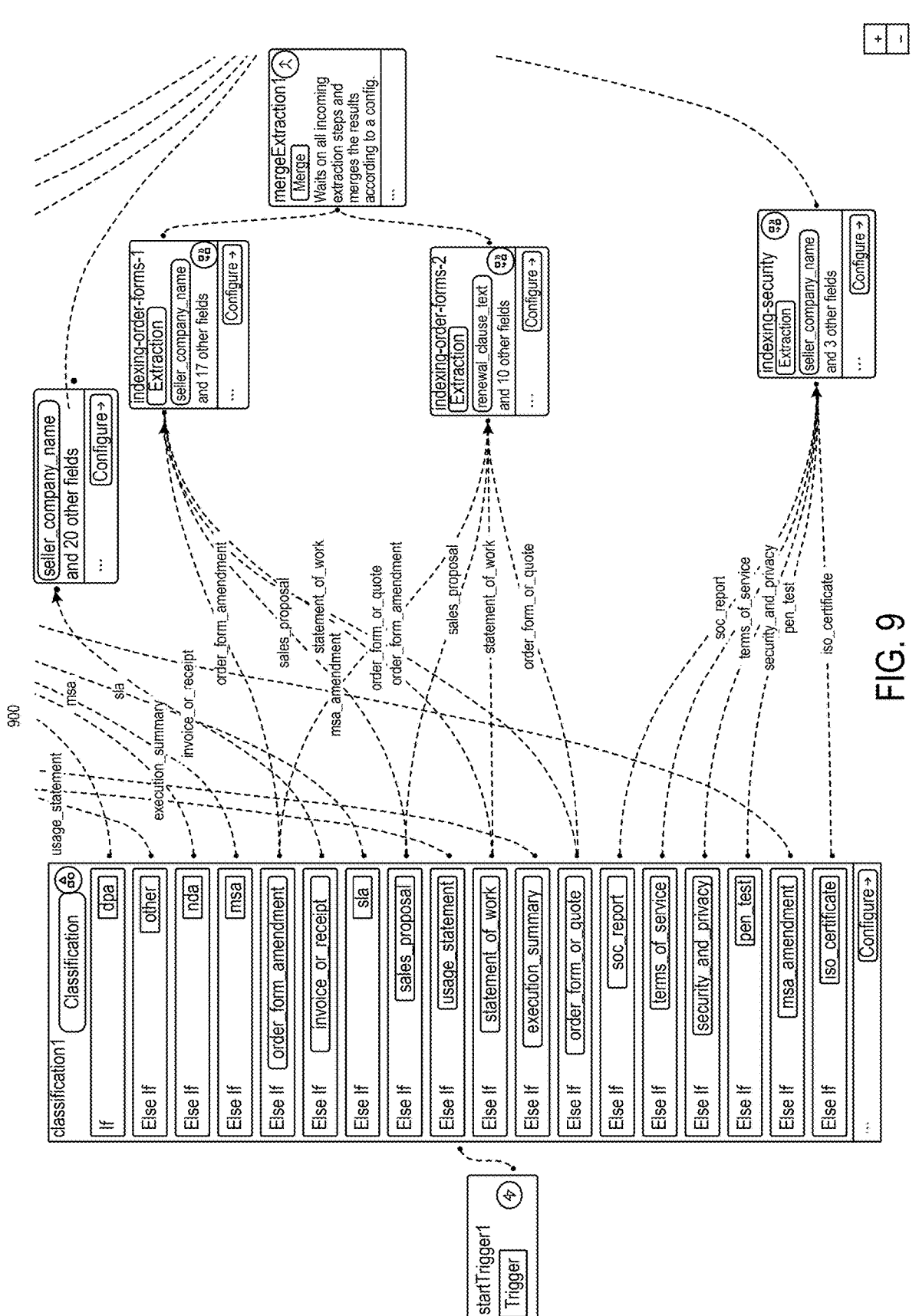
FIG. 9 shows an example plot of classifications that can be implemented according to a plurality of rules.

FIG. 9 illustrates an example plot 900 of classifications that can be implemented according to a plurality of rules. The classifications can pertain to different types of documents, such as data processing agreements (DPA), non-disclosure agreements (NDA), master service agreements (MSA), service level agreements (SLA), invoice or receipts, order form amendments, sales proposal, statements of work, usage statements, order forms or quotes, execution summaries, system or organization controls (SOC) report, terms of service, certificates or other documents. The plot 900 can show various connections or relations between different documents types and various form classifications.

Figure 10:
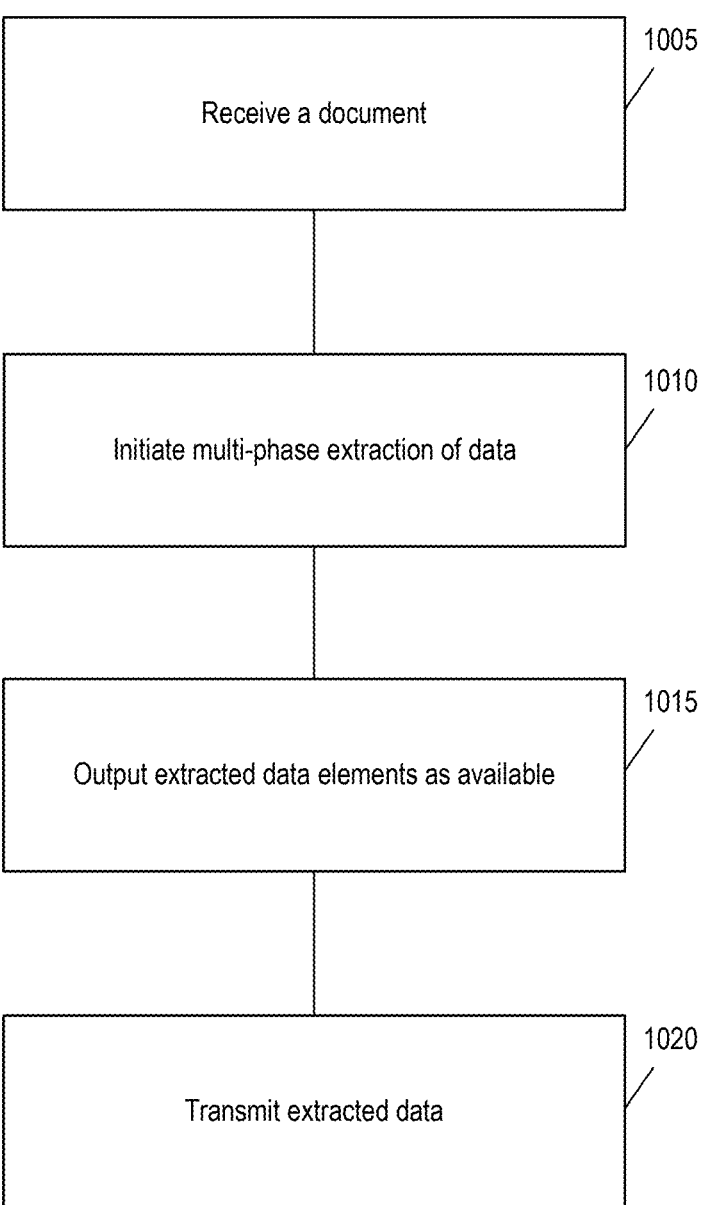
FIG. 10 illustrates a flow diagram of a method for providing data extraction and data processing in accordance with some embodiments.

FIG. 10 illustrates a flow diagram of a method 1000 for providing data extraction and data processing. The method 1000 can be performed by one or more systems, features, techniques or components depicted in FIGS. 1-9, including, for example, a data processing system 310 of a system 300 in FIG. 3. The data processing system 310, or its functionalities, can be implemented using one or more processors 115 configured to perform the functionalities of the data processing system based on instructions, computer code or data stored on memory or storage (e.g., 120 or 125) of a computing system 100. At a high level, method 1000 can include acts 1005-1020. At 1005, the method can include receiving a document. At 1010, the method can include initiating a multi-phase extraction of data. At 1015, the method can include outputting of extracted data elements as they become available. At 1020, the method can include transmitting the extracted data.

At 1005, the method can include receiving a document. The method can include one or more processors coupled with memory receiving, via an API call, an electronic document and an associated extraction plan selection. For instance, the client device can transmit to the data processing system information for selecting an extraction plan, such as the level of data analysis and extraction, a time duration of the process or any other constraints.

At 1010, the method can include initiating a multi-phase extraction of data. The method can include the one or more processors initiating a multi-phase extraction process on the electronic document. The multi-phase extraction of data can include an extraction phase, wherein an optical character recognition (OCR) process is performed on the document and output of the OCR process is input into one or more artificial intelligence (AI) models guided by one or more prompts specific to a selected extraction plan. The multi-phase extraction of data can include a transformation phase, wherein extracted data is processed to clean and standardize string values, perform canonicalization of data, map extracted values to predefined sets and apply rule-based transformations based on the overall extraction context. The multi-phase extraction of data can include an augmentation phase, wherein transformed data is mapped to organization-specific identifiers, including at least one of: company identifiers, product identifiers, product tier identifiers or product addon identifiers.

At 1015, the method can include outputting of extracted data elements as they become available. The method can include the one or more processors outputting the extracted data elements as the extracted data elements become available during the extraction process. For instance, the one or more processors can utilize an application for real-time data outputting as the extracted data becomes available.

At 1020, the method can include transmitting the extracted data. The method can include the one or more processors transmitting a final payload containing all extracted and processed data elements upon completion of the multi-phase extraction process. The method can be adaptable to various document types including, but not limited to, contracts and agreements, wherein the extraction plan selection determines the specific data elements to be extracted and the processing time of the extraction.

Figure 11:
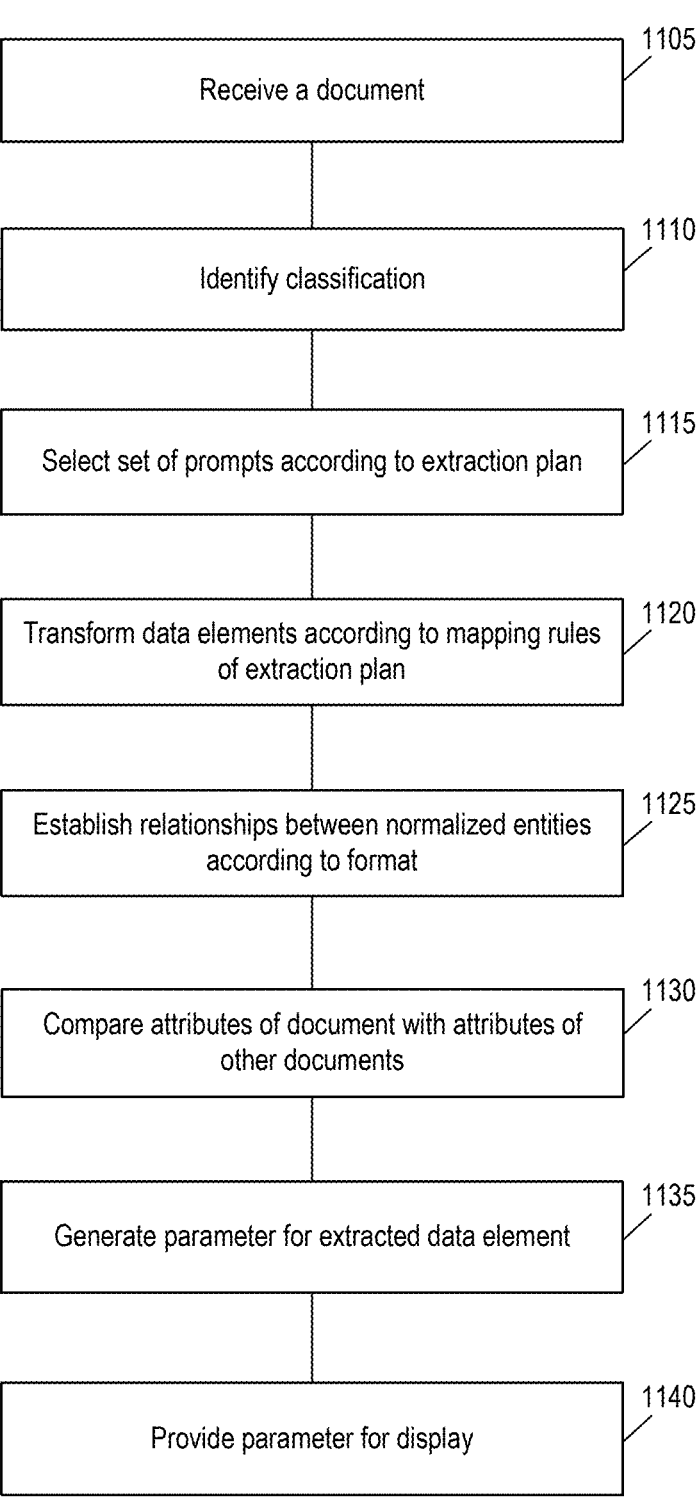
FIG. 11 is a flow diagram illustrating a method for providing data extraction, processing, and analysis, in accordance with some embodiments.

FIG. 11 illustrates a flow diagram of a method 1100 for providing data extraction, processing and comparative analysis, according to embodiments. The method 1100 can be performed by one or more systems, features, techniques or components depicted in FIGS. 1-9, including, for example, a data processing system 310 of a system 300 in FIG. 3. The data processing system 310, or its functionalities, can be implemented using one or more processors 115 configured to perform the functionalities of the data processing system based on instructions, computer code or data stored on memory or storage (e.g., 120 or 125) of a computing system 100, which can cause the one or more processors 115 to implement various functionalities or operations of the method. At a high level, method 1100 can include acts 1105-1035. At 1105, the method can include receiving a document. At 1110, the method can identify classification. At 1115, the method can select a set of prompts according to extraction plan. At 1120, the method can include transforming data elements according to mapping rules of extraction plan. At 1125, the method can include establishing relationships between entities normalized according to format. At 1130, the method can include comparing attributes of the received document with attributes of other previously processed documents. At 1135, the method can include generating parameter for extracted data elements. At 1140, the method can include providing parameter for display.

At 1105, the method can include receiving a document. For example, the method can include one or more processors that are coupled with memory and executing a data processing system, receiving, from a client device, an electronic document corresponding to a client account. The one or more processors can receive, for example, a contract (e.g., for a service or a product), a purchase and sales agreement, a datasheet or an offer for a product or service. The method can include the data processing system receiving the electronic document using an application programming interface (API) call, such as an API call transmitted as a part of a network process.

The method can include the data processing system receiving the extraction plan from the client device or another function on the network. The extraction plan can include a plan identifier that specifies the set of one or more prompts and the set of one or more mapping rules to use for evaluation or processing of the agreement.

In an example, the data processing system=can receive an electronic document corresponding to a client account via an API call or via a user interface. The electronic document can include, for example, a contract, invoice, technical specification, or other supported file type such as a PDF or DOCX. Receipt of the electronic document can initiate the automated extraction workflow, which can include generating a processing job, assigning a job identifier, and storing the document in persistent storage. The data processing system can execute logic to register metadata associated with the document, associate the document with the client account, and prepare the document for subsequent extraction steps. The data processing system can store the document in a secure storage location, index the document for processing, and update job metadata for tracking purposes.

At 1110, the method can identify classification. The method can include the one or more processors identifying, from a plurality of classifications, a classification for at least a portion of the electronic document. For instance, the extraction function can include a classification selection functionality to classify the elements of the received document and identify classifications for the received elements. For instance, the method can classify the electronic document as at least one of: a classification for a contract, a classification for an agreement, a classification for an invoice, a classification for a purchase order, a classification for a statement of work, a classification for a technical specification, a classification for a data sheet, a classification for a financial report, a classification for a service-level agreement, a classification for a proposal, or a classification for a memorandum of understanding.

In an example, data processing system 310 can determine a classification for the received electronic document, such as contract, invoice, statement of work, technical specification, or financial report, among others. The data processing system can use artificial intelligence models or rule-based heuristics to classify the electronic document, for example, as a master service agreement or technical specification. The identification of classification can occur after the electronic document is received and prior to extraction plan selection. The data processing system can execute logic to analyze document content, metadata, or structure to assign a classification label. The data processing system can parse document headers or use a trained model to determine the document type.

At 1115, the method can select a set of prompts according to extraction plan. The method can include the one or more processors selecting, based on the classification, a set of one or more prompts for one or more artificial intelligence (AI) models according to an extraction plan specifying the set of one or more prompts and a set of one or more mapping rules to extract one or more data elements from the electronic document. The method can include utilizing artificial intelligence (AI) models comprising at least one of: a natural language processing model, a machine learning model, or a generative AI model. For instance, AI models can be used to classify portions of the received document, transform documents into the canonical (e.g., common) format or implement prompts of the prompt sets 344 according to rule sets 342, based on the schemas 346.

In an example, the data processing system can select, based on the identified classification, a set of one or more prompts for one or more artificial intelligence models according to an extraction plan specifying the set of one or more prompts and a set of one or more mapping rules to extract one or more data elements from the electronic document. The data processing system can select the schema or the prompts for extracting contract terms, product names, pricing details, or other relevant data elements from the electronic document or based on the content of the electronic document. The selection of prompts can occur after the classification is identified and before data extraction begins. The data processing system can execute logic to retrieve prompt sets and mapping rules from storage, based on the extraction plan associated with the document classification. The data processing system can load a prompt set for software-as-a-service agreements when the electronic document is classified as a contract.

At 1120, the method can include transforming data elements according to mapping rules of extraction plan. The method can include the one or more processors transforming the one or more data elements extracted based on the set of one or more prompts to map to one or more predefined sets according to the set of one or more mapping rules of the extraction plan. For example, mapping to one or more predefined sets can mean converting extracted values such as contract terms, product names, or pricing details to standardized categories, enumerated lists, or formats defined by the system-such as mapping a contract's billing frequency to a set of allowed values like "monthly," "quarterly," or "annual," or mapping a product name to a predefined list of recognized SKUs.

The transformation of data elements according to mapping rules can include processing the extracted one or more data elements using a schema. The schema can be configured to associate the extracted one or more data elements with corresponding one or more entities. For example, the schema can associate an extracted contract start date, total contract value, or discount percent from a document 306 with a contract entity, ensuring each attribute is linked to its corresponding entity for further processing and analysis. The schema can be configured to normalize the extracted one or more data elements according to a canonical format using the set of one or more mapping rules. For example, the schema may convert various date formats found in different documents to a standardized YYYY-MM-DD format, map product names to a predefined list of SKUs, or translate billing frequency terms such as "monthly," "quarterly," or "annual" to a uniform set of enumerated values, enabling consistent comparison and aggregation across documents.

For instance, the transformation of the one or more data elements extracted from the electronic document can include at least one of: removing non-textual characters from the extracted data elements that are string values, converting date values among the extracted data elements to a uniform date format specified by the extraction plan, mapping the extracted data elements to predefined categories or enumerated lists specified in the extraction plan, or applying rule-based logic specified by the extraction plan to fill missing values or correct inconsistencies in the extracted data elements.

In an example, the data processing system can transform the one or more data elements extracted based on the set of one or more prompts to map to one or more predefined sets according to the set of one or more mapping rules of the extraction plan. The data processing system can clean and standardize string values, convert date formats, and map extracted values to enumerated categories. The transformation can occur after data elements are extracted and before relationships are established between entities. The data processing system can execute logic to apply mapping rules, schemas, and canonicalization routines to the extracted data elements. The data processing system can use rule sets to convert monetary values to a single currency or map product names to standardized identifiers.

At 1125, the method can include establishing relationships between normalized entities according to format. For instance, the method can include establishing, by the one or more processors one or more relationships between the normalized one or more entities according to the canonical format. For example, a data analyzer can establish a relationship between a product entity and its associated SKU entity, link a contract entity to its corresponding client account entity, or connect a pricing attribute to an acceptable range entity for validation and benchmarking purposes. The schema can be used by the data processing system to maintain relationships among entities. For instance, the entities can include at least one of: an SKU record, a product record, a product tier record, a product add-on record, and an acceptable range records.

In an example, the data processing system can establish one or more relationships between the normalized one or more entities according to the canonical format. The data processing system can link a product entity to its associated stock keeping unit, tier, or add-on records within the extracted data. The establishment of relationships can occur after data elements are transformed and before attribute comparison with other documents. The data processing system can execute logic to update schemas, data structures, and relationship tables to reflect associations among entities. The data processing system can create or update records in a scientific data management system to represent entity relationships.

At 1130, the method can include comparing attributes of the received document with attributes of other previously processed documents. The method can include the data analyzer comparing, using the schema and the normalized one or more entities, attributes of the electronic document with attributes of one or more documents corresponding to one or more different client accounts. The one or more documents can correspond to the one or more different client accounts and the attributes being compared can be associated with the classification.

The method can include the data analyzer determining a comparison metric based on a deviation between the normalized one or more entities and the attributes of one or more documents corresponding to one or more different client accounts that are normalized according to the canonical format. The data analyzer can compare, based on the comparison metric, the attributes of the electronic document with the attributes of one or more documents corresponding to one or more different client accounts. The data analyzer can determine the comparison metric as a deviation metric computed between attributes of normalized entities of the electronic document and a distribution of normalized attributes derived from the one or more documents corresponding to one or more different client accounts and to the classification. The data analyzer can identify anomalies or outliers in the attributes of the electronic document relative to the attributes of one or more documents having the classification and associated with one or more different client accounts. The outliers can include values that are outside of an expected or acceptable range. The outliers can be identified or flagged as potential errors to be reviewed.

In an example, the data processing system can compare, using the schema and the normalized one or more entities, attributes of the electronic document with attributes of one or more documents corresponding to one or more different client accounts, where the one or more documents corresponding to the one or more different client accounts are associated with the classification. The data processing system can compare extracted contract prices to a distribution of prices from similar contracts in other client accounts. The comparison can occur after relationships are established and before parameter generation for extracted data elements. The data processing system can execute logic to compute comparison metrics, identify anomalies, and benchmark extracted data against peer documents. The data processing system can calculate a deviation metric and flag outliers for further review or recommendation.

At 1135, the method can include generating parameter for extracted data elements. The method can include the data analyzer generating a parameter for an extracted data element of the extracted one or more data elements from the electronic document by reference to one or more data elements corresponding to the one or more different client accounts. The data analyzer can generate the parameter based on the one or more relationships and the comparison of the attributes of the electronic document with the attributes of one or more documents corresponding to one or more different client accounts.

The data analyzer can determine the parameter for the extracted data element based on temporal information of the one or more documents corresponding to the one or more different client accounts stored in the schema and based on a trend in the attributes of the one or more documents. The data analyzer can identify temporal information of the electronic document and generate the parameter for the extracted data element based on the temporal information.

In an example, the data processing system can generate, based on the one or more relationships and the comparison of the attributes of the electronic document with the attributes of one or more documents corresponding to one or more different client accounts, a parameter for an extracted data element of the extracted one or more data elements from the electronic document by reference to one or more data elements corresponding to the one or more different client accounts. The data processing system can generate a grade, score, or recommendation for the extracted contract term or pricing attribute. The parameter generation can occur after attribute comparison and before providing the parameter for display. The data processing system can execute logic to compute grades, scores, or recommendations based on reference data and benchmarking results. The data processing system 310 can assign a contract strength grade or suggest renegotiation based on detected trends.

At 1140, the method can include providing parameter for display. The method can include the one or more processor providing, for display on the client account, the parameter for the extracted data element corresponding to one of a grade, a score, or a recommendation. The method can include a network interface providing, for display on the client device, the recommendation for at least one of: a target price, a discount range, or a contract term based on the comparison. The method can include providing, for display on the client device, each extracted data element as it is generated by the transformation of the one or more data elements extracted from the electronic document, prior to completion of the transformation of all data elements.

In an example, a data processing system can provide, for display on the client account, the parameter for the extracted data element corresponding to one of a grade, a score, or a recommendation. The data processing system can transmit the grade, score, or recommendation to the client device via a user interface or application programming interface. The parameter can be provided for display after parameter generation is complete and the output is ready for delivery. The data processing system can execute logic to format the parameter, transmit it to the client device, and update job metadata to indicate completion. The data processing system can update the client dashboard or send a webhook notification with the extracted data element and associated parameter.

The foregoing examples have been provided merely for the purpose of explanation and are in no way to be construed as limiting of the technical solutions. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as substitutions, changes and omissions can be made in the design, operating conditions and arrangement of the disclosed elements and operations without departing from the scope of the present disclosure.

References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:

one or more processors coupled with memory, configured to:

receive, from a client device, an electronic document corresponding to a client account;

identify, from a plurality of classifications, a classification for at least a portion of the electronic document;

select, based on the classification, a set of one or more prompts for one or more artificial intelligence (AI) models according to an extraction plan specifying the set of one or more prompts and a set of one or more mapping rules to extract one or more data elements from the electronic document;

transform the one or more data elements extracted based on the set of one or more prompts to map to one or more predefined sets according to the set of one or more mapping rules of the extraction plan, wherein the transformation comprises processing the extracted one or more data elements using a schema that is configured to:

(i) associate the extracted one or more data elements with corresponding one or more entities, and (ii) normalize the extracted one or more data elements according to a canonical format using the set of one or more mapping rules;

establish one or more relationships between the normalized one or more entities according to the canonical format;

compare, using the schema and the normalized one or more entities, attributes of the electronic document with attributes of one or more documents corresponding to one or more different client accounts, wherein the one or more documents corresponding to the one or more different client accounts are associated with the classification;

generate, based on the one or more relationships and the comparison of the attributes of the electronic document with the attributes of one or more documents corresponding to one or more different client accounts, a parameter for an extracted data element of the extracted one or more data elements from the electronic document by reference to one or more data elements corresponding to the one or more different client accounts; and provide, for display on the client device, the parameter for the extracted data element corresponding to one of a grade, a score, or a recommendation.

2. The system of claim 1, wherein the one or more processors are further configured to:

determine a comparison metric based on a deviation between the normalized one or more entities and the attributes of one or more documents corresponding to one or more different client accounts that are normalized according to the canonical format; and compare, based on the comparison metric, the attributes of the electronic document with the attributes of one or more documents corresponding to one or more different client accounts.

3. The system of claim 2, wherein the one or more processors are further configured to:

normalize data elements of the one or more documents corresponding to the one or more different client accounts according to the canonical format using the set of one or more mapping rules; and identify the attributes of one or more documents corresponding to one or more different client accounts based on the normalized data elements of the one or more documents.

4. The system of claim 2, wherein the one or more processors are further configured to:

determine the comparison metric as a deviation metric computed between attributes of normalized entities of the electronic document and a distribution of normalized attributes derived from the one or more documents corresponding to one or more different client accounts and to the classification.

5. The system of claim 1, wherein the one or more processors are further configured to classify the electronic document as at least one of: a classification for a contract, a classification for an agreement, a classification for an invoice, a classification for a purchase order, a classification for a statement of work, a classification for a technical specification, a classification for a data sheet, a classification for a financial report, a classification for a service-level agreement, a classification for a proposal, or a classification for a memorandum of understanding.

6. The system of claim 1, wherein the one or more processors are further configured to receive the extraction plan from the client device, wherein the extraction plan comprises a plan identifier that specifies the set of one or more prompts and the set of one or more mapping rules.

7. The system of claim 1, wherein the one or more processors are further configured to maintain relationships among entities in the schema, wherein the entities comprise at least one of: a SKU record, a product record, a product tier record, a product add-on record, and an acceptable range records.

8. The system of claim 1, wherein the one or more processors are further configured to provide, for display on the client device, the recommendation for at least one of: a target price, a discount range, or a contract term based on the comparison.

9. The system of claim 1, wherein the one or more processors are further configured to utilize artificial intelligence (AI) models comprising at least one of: a natural language processing model, a machine learning model, or a generative AI model.

10. The system of claim 1, wherein the one or more processors are further configured to identify anomalies or outliers in the attributes of the electronic document relative to the attributes of one or more documents having the classification and associated with one or more different client accounts.

11. The system of claim 1, wherein the one or more processors are further configured to:

identify temporal information of the electronic document; and generate the parameter for the extracted data element based on the temporal information.

12. The system of claim 11, wherein the one or more processors are further configured to determine the parameter for the extracted data element based on temporal information of the one or more documents corresponding to the one or more different client accounts stored in the schema and based on a trend in the attributes of the one or more documents.

13. The system of claim 1, wherein the one or more processors are further configured to receive the electronic document using an application programming interface (API) call.

14. The system of claim 1, wherein the transformation of the one or more data elements extracted from the electronic document comprises at least one of: (i) removing non-textual characters from the extracted data elements that are string values, (ii) converting date values among the extracted data elements to a uniform date format specified by the extraction plan, (iii) mapping the extracted data elements to predefined categories or enumerated lists speci-fied in the extraction plan, or (iv) applying rule-based logic specified by the extraction plan to fill missing values or correct inconsistencies in the extracted data elements.

15. The system of claim 1, wherein the one or more processors are further configured to provide, for display on the client device, each extracted data element as it is generated by the transformation of the one or more data elements extracted from the electronic document, prior to completion of the transformation of all data elements.

16. A method, comprising:

receiving, by one or more processors coupled with memory, from a client device, an electronic document corresponding to a client account;

identifying, by the one or more processors, from a plu-rality of classifications, a classification for at least a portion of the electronic document;

selecting, by the one or more processors, based on the classification, a set of one or more prompts for one or more artificial intelligence (AI) models according to an extraction plan specifying the set of one or more prompts and a set of one or more mapping rules to extract one or more data elements from the electronic document;

transforming, by the one or more processors, the one or more data elements extracted based on the set of one or more prompts to map to one or more predefined sets according to the set of one or more mapping rules of the extraction plan, wherein the transformation comprises processing the extracted one or more data elements using a schema that is configured to:

(i) associate the extracted one or more data elements with corresponding one or more entities, and (ii) normalize the extracted one or more data elements according to a canonical format using the set of one or more mapping rules;

establishing, by the one or more processors one or more relationships between the normalized one or more entities according to the canonical format;

comparing, by the one or more processors, using the schema and the normalized one or more entities, attri-butes of the electronic document with attributes of one or more documents corresponding to one or more different client accounts, wherein the one or more documents corresponding to the one or more different client accounts are associated with the classification;

generating, by the one or more processors, based on the one or more relationships and the comparison of the attributes of the electronic document with the attributes of one or more documents corresponding to one or more different client accounts, a parameter for an extracted data element of the extracted one or more data elements from the electronic document by refer-ence to one or more data elements corresponding to the one or more different client accounts;

providing, by the one or more processors, for display on the client device, the parameter for the extracted data element corresponding to one of a grade, a score, or a recommendation.

17. The method of claim 16, comprising:

determining, by the one or more processors, a comparison metric based on a deviation between the normalized one or more entities and the attributes of one or more documents corresponding to one or more different client accounts that are normalized according to the canonical format; and comparing, by the one or more processors, based on the comparison metric, the attributes of the electronic document with the attributes of one or more documents corresponding to one or more different client accounts.

18. The method of claim 17, comprising:

normalizing, by the one or more processors, data elements of the one or more documents corresponding to the one or more different client accounts according to the canonical format using the set of one or more mapping rules; and identifying, by the one or more processors, the attributes of one or more documents corresponding to one or more different client accounts based on the normalized data elements of the one or more documents.

19. The method of claim 17, comprising:

determining, by the one or more processors, the compari-son metric as a deviation metric computed between attributes of normalized entities of the electronic docu-ment and a distribution of normalized attributes derived from the one or more documents corresponding to one or more different client accounts and to the classifica-tion.

20. A non-transitory computer-readable media storing instructions that, when executed by one or more processors, cause the one or more processors to:

receive, from a client device, an electronic document corresponding to a client account;

identify, from a plurality of classifications, a classification for at least a portion of the electronic document;

select, based on the classification, a set of one or more prompts for one or more artificial intelligence (AI) models according to an extraction plan specifying the set of one or more prompts and a set of one or more mapping rules to extract one or more data elements from the electronic document;

transform the one or more data elements extracted based on the set of one or more prompts to map to one or more predefined sets according to the set of one or more mapping rules of the extraction plan, wherein the transformation comprises processing the extracted one or more data elements using a schema that is configured to:

(i) associate the extracted one or more data elements with corresponding one or more entities, and (ii) normalize the extracted one or more data elements according to a canonical format using the set of one or more mapping rules;

establish one or more relationships between the normal-ized one or more entities according to the canonical format;

compare, using the schema and the normalized one or more entities, attributes of the electronic document with attributes of one or more documents correspond-ing to one or more different client accounts, wherein the one or more documents corresponding to the one or more different client accounts are associated with the classification;

generate, based on the one or more relationships and the comparison of the attributes of the electronic document with the attributes of one or more documents corresponding to one or more different client accounts, a parameter for an extracted data element of the extracted one or more data elements from the electronic document by reference to one or more data elements corresponding to the one or more different client accounts;

provide, for display on the client device, the parameter for the extracted data element corresponding to one of a grade, a score, or a recommendation.

\*     \*     \*     \*     \*